(12) United States Patent
Tiramani et al.

(10) Patent No.: US 11,293,467 B2
(45) Date of Patent: Apr. 5, 2022

(54) CHASSIS ANCHORING SYSTEMS

(71) Applicant: Auto IP LLC, Las Vegas, NV (US)

(72) Inventors: Paolo Tiramani, Las Vegas, NV (US); Kyle Denman, North Las Vegas, NV (US)

(73) Assignee: Auto IP LLC, Las Vegas, NV (US)

( * ) Notice: Subject to any disclaimer, the term of this patent is extended or adjusted under 35 U.S.C. 154(b) by 282 days.

(21) Appl. No.: 16/579,554

(22) Filed: Sep. 23, 2019

(65) Prior Publication Data

US 2020/0063775 A1    Feb. 27, 2020

Related U.S. Application Data

(63) Continuation-in-part of application No. 16/168,978, filed on Oct. 24, 2018, now Pat. No. 10,823,273, and a continuation-in-part of application No. 16/168,957, filed on Oct. 24, 2018.

(60) Provisional application No. 62/736,021, filed on Sep. 25, 2018, provisional application No. 62/735,966, filed on Sep. 25, 2018, provisional application No. 62/616,601, filed on Jan. 12, 2018, provisional application No. 62/577,965, filed on Oct. 27, 2017, provisional application No. 62/577,423, filed on Oct. 26, 2017.

(51) Int. Cl.
*F16B 7/18* (2006.01)
*F16B 7/04* (2006.01)
*F16C 11/04* (2006.01)

(52) U.S. Cl.
CPC .............. *F16B 7/185* (2013.01); *F16B 7/044* (2013.01); *F16C 11/04* (2013.01)

(58) Field of Classification Search
CPC .. F16B 7/185; F16B 7/044; F16B 7/18; F16C 11/04; B62D 27/06; B62D 21/09; B62D 23/005; B60G 2204/143; B60G 2204/43; B60G 2206/8207; B60G 2204/10; B60G 2204/128; B60G 7/02; B60G 13/003
See application file for complete search history.

(56) References Cited

U.S. PATENT DOCUMENTS

| 3,850,534 | A | 11/1974 | O'Halloran |
| 4,923,322 | A | 5/1990 | Burg |
| 5,028,071 | A | 7/1991 | Bolam |
| 6,565,279 | B1 | 5/2003 | Skovronski et al. |

(Continued)

OTHER PUBLICATIONS

PCT International Search Report and Written Opinion dated Nov. 25, 2019, in International Appliation No. PCT/US2019/052479.

(Continued)

*Primary Examiner* — Drew J Brown
(74) *Attorney, Agent, or Firm* — McCarter & English, LLP

(57) ABSTRACT

A load anchor assembly for attachment to a tubular member having an exterior surface, comprising an anchor base and a portion extending from the anchor base adapted to secure a vehicle component. The assembly includes a boss having a first flanged end and a second end, where the boss is adapted to be positioned in first and second apertures in the exterior surface of the tubular member with the flanged end in contact with the first aperture and the second end accessible through the second aperture. There is at least one fastener connected to the anchor base and the second end to secure the anchor base to the flanged boss.

19 Claims, 23 Drawing Sheets

(56) References Cited

U.S. PATENT DOCUMENTS

| | | | |
|---|---|---|---|
| 6,786,302 B2* | 9/2004 | Liew | E04G 7/14 |
| | | | 182/186.8 |
| 2006/0045611 A1 | 3/2006 | Castellon | |
| 2012/0234418 A1 | 9/2012 | Lemoine | |
| 2014/0225343 A1 | 8/2014 | Hudler | |
| 2018/0062569 A1* | 3/2018 | Oh | F24S 30/00 |

OTHER PUBLICATIONS

U.S. Appl. No. 16/168,957, filed Oct. 24, 2018, Paolo Tiramani et al.
U.S. Appl. No. 16/168,978, filed Oct. 24, 2018, Paolo Tiramani et al.
U.S. Appl. No. 16/579,524, filed Sep. 23, 2019, Paolo Tiramani et al.
U.S. Appl. No. 16/579,571, filed Sep. 23, 2019, Paolo Tiramani et al.
U.S. Appl. No. 16/589,308, filed Oct. 1, 2019, Paolo Tiramani et al.

* cited by examiner

CHASSIS ANCHORING SYSTEMS

CROSS-REFERENCES TO RELATED APPLICATIONS

This application is a continuation-in-part application of U.S. Nonprovisional patent application Ser. No. 16/168,957, filed Oct. 24, 2018, and U.S. Nonprovisional patent application Ser. No. 16/168,978, filed Oct. 24, 2018, each of which claims the benefit of U.S. Provisional Application No. 62/577,423, filed Oct. 26, 2017, U.S. Provisional Application No. 62/577,965, filed Oct. 27, 2017, U.S. Provisional Application No. 62/616,601, filed Jan. 12, 2018 and U.S. Provisional Application No. 62/735,966, filed Sep. 25, 2018; and this application claims the benefit of U.S. Provisional Application No. 62/735,966, filed Sep. 25, 2018 and the benefit of U.S. Provisional Application No. 62/736,021, filed Sep. 25, 2018.

BACKGROUND OF THE INVENTION

Field of the Invention

This invention relates to vehicle structural design.

Description of the Related Art

A variety of structural arrangements are currently utilized in automotive vehicles for fixing in position the power, suspension and payload-bearing components relative to each other. Such structural arrangements, in some contexts referred to as the vehicle's chassis, range from a ladder chassis design, in which components are by and large secured to robust metallic beams running longitudinally and transversely underneath the vehicle, to a monocoque design, where there is not any structure specifically tasked to secure load components, but instead the vehicle's skin performs that function.

A structural arrangement arguably intermediate between the ladder chassis and the monocoque design is in the form of a tubular exoskeleton, sometimes referred to as a space frame. The exoskeleton/space frame employs a number of tubular members fastened to each other and arranged to form a three dimensional skeleton-like structure that distributes compressive, bending and torsional loads somewhat in the manner of a monocoque design, yet provides multiple discrete regions for securing load components, in the manner of a ladder frame (although to a greater extent). The exoskeleton/space frame is often employed for limited production vehicles, due to it high performance and relative ease of manufacture.

Vehicle components are generally attached to the tubular members of an exoskeleton/space frame using chassis tabs. Chassis tabs generally are metallic pieces, cut from plate stock, sometimes bent to shape and/or drilled to accept a bolt, and then welded to the tubular members at discrete locations. However, chassis tabs are labor-intensive to install, being subject to movement or creep during installation. Further, chassis tabs create localized areas of stress and are known to break, and are unsightly and potentially hazardous if left on the tubular member in the event a component is relocated to another position.

SUMMARY OF THE INVENTION

The present inventions provide chassis anchoring systems that are easy to install and strong, and which permit removal and relocation of vehicle components without leaving behind vestigial protrusions as in the case of chassis tabs. The subject inventions are not subject to movement or creep during installation, and do not induce localized stress areas in the manner of chassis tabs. In contrast therewith, the subject inventions can increase the strength in the anchoring region, and, when used to secure vehicle components to tubular structural members, distribute the force transferred to both sides of the member. Among other applications, the inventions described herein have utility in securing active components to a vehicle's chassis, such as shock absorbers, suspension and brake arms and linkages, door and compartment hinges and the like.

In one aspect, the present invention is directed to an anchor assembly for attachment to a tubular member having an exterior surface, where the assembly comprises an anchor base and first and second opposed spaced-apart anchor cheek members extending from the anchor base, and where the anchor cheek members are adapted to secure a load-bearing vehicle component. The anchor base comprises a load-bearing exterior skirt and a load-bearing interior skirt circumscribed by the exterior skirt, where the exterior and interior skirts are dimensioned to be in contact with the exterior surface of the tubular member when positioned against it; the exterior skirt has a first pair of spaced-apart opposed cut-outs, with each of the first pair of cut-outs having a shape that generally conforms to a shape of the exterior surface of the tubular member; and the interior skirt has a second pair of spaced-apart opposed cut-outs, with each of the second pair of cut-outs having a shape that generally conforms to the shape of the exterior surface of the tubular member. The assembly further comprises a boss having a first flanged end and a second end, where the boss is adapted to be positioned in first and second apertures in the exterior surface of the tubular member with the flanged end in contact with the first aperture and the second end accessible through the second aperture; and a fastener connected to the anchor base and the second end to secure the anchor base to the boss.

In another aspect, the invention is directed to a two-position anchor assembly for attachment to a tubular member having an exterior surface, where the assembly comprises an anchor base and first and second opposed spaced-apart anchor cheek members extending from the anchor base, and where the anchor cheek members are adapted to secure a vehicle component. The anchor base comprises a load-bearing exterior skirt and a load-bearing interior skirt circumscribed by the exterior skirt, where the exterior and interior skirts are dimensioned to be in contact with the exterior surface of the tubular member when positioned against it; the exterior skirt has first and second pairs of spaced-apart opposed cut-outs, with the first pair being approximately perpendicular to the second pair, and with each of the cut-outs of the first and second pairs of cut-outs having a shape that generally conforms to a shape of the exterior surface of the tubular member; and the interior skirt has third and fourth pairs of spaced-apart opposed cut-outs, with the third pair being approximately perpendicular to the fourth pair, and with each of the cut-outs of the third and fourth pairs of cut-outs having a shape that generally conforms to the shape of the exterior surface of the tubular member. The assembly further comprises a boss having a first flanged end and a second end, where the boss is adapted to be positioned in first and second apertures in the exterior surface of the tubular member with the flanged end in contact with the first aperture and the second end accessible through the second aperture; and a fastener connected to the anchor base and the second end to secure the anchor base to the boss.

In yet another aspect, the invention is directed to a bearing anchor assembly for attachment to a tubular member having an exterior surface, comprising an anchor base and first and second opposed spaced-apart anchor cheek plates extending from the anchor base, where the first and second anchor cheek plates each includes portions that define an annular aperture and where the assembly additionally comprises a cylindrical shroud joining the portions of the first and second anchor cheek plates which define the first and second apertures to thereby define a recess, with the recess adapted to receive a bearing assembly. The assembly additionally incudes a boss having a first flanged end and a second end, where the boss is adapted to be positioned in first and second apertures in the exterior surface of the tubular member with the flanged end in contact with the first aperture and the second end accessible through the second aperture; and at least one fastener connected to the anchor base and the second end to secure the anchor base to the boss.

In a further aspect, the invention is directed to a load anchor assembly for attachment to a tubular member having an exterior surface, comprising an anchor base and first and second opposed spaced-apart anchor cheek plates extending from the anchor base, where the anchor cheek plates are adapted to secure a vehicle component; a boss having a first flanged end and a second end, the boss adapted to be positioned in first and second apertures in the exterior surface of the tubular member with the flanged end in contact with the first aperture and the second end accessible through the second aperture; and at least one fastener connected to the anchor base and the second end to secure the anchor base to the boss.

In a still further aspect, the invention is directed to an anchor assembly for attachment to a tubular member having an exterior surface, the anchor assembly comprising an anchor yoke having two opposed fastening mounts, each defining an annular aperture, an accessory support strut joined to the anchor yoke, an accessory mounting surface distal from the anchor yoke and joined to the accessory support strut, a boss having a first flanged end and a second end, the boss adapted to be positioned in first and second apertures in the exterior surface of the tubular member with the flanged end in contact with the first aperture and the second end accessible through the second aperture, and a fastener passing through each of the annular apertures of the two opposed fastening mounts and the boss to secure the anchor yoke to the boss.

These and other aspects of the present invention are described in the drawings annexed hereto, and in the description of the preferred embodiments and claims set forth below.

DETAILED DESCRIPTION OF THE PREFERRED EMBODIMENTS

Figure 1:
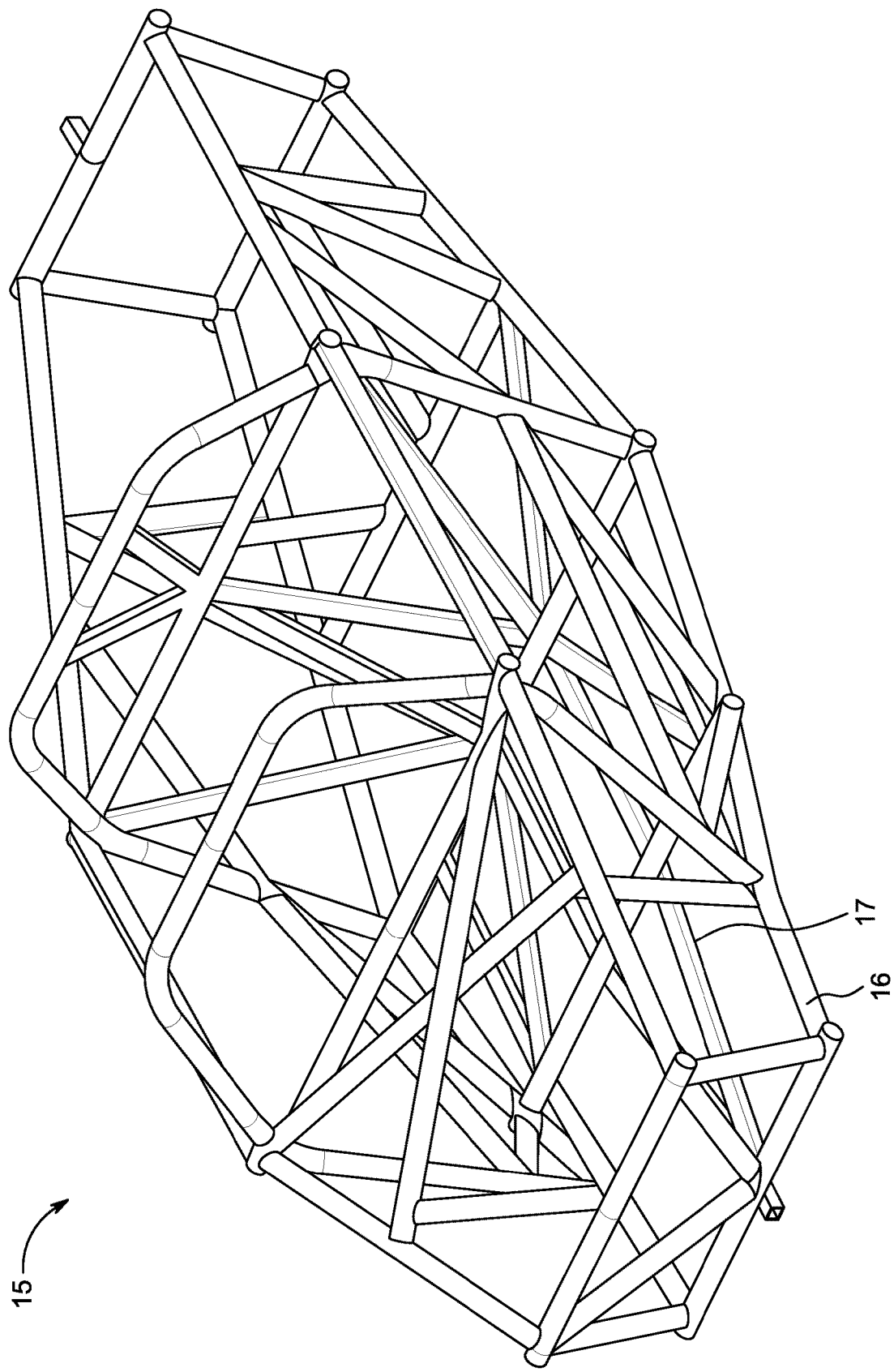
FIG. 1 depicts an exoskeleton/space frame chassis in respect of which the present invention can be employed.

FIG. 1 depicts the exoskeleton/space frame chassis 15 of a type in which the chassis anchoring system described herein can be used. Chassis 15 is characterized by a number of tubular members fastened to each other and arranged to form a three dimensional skeleton-like structure. The tubular members of chassis 15 are of two types: circular in cross section, as exemplified by tubular member 16, and rectangular, as exemplified by tubular member 17. The present invention can be utilized with tubular members of either cross section, or for that matter, any elongate or other vehicle component sufficiently robust to bear the loads transferred to it by the anchoring system described herein.

The chassis anchoring system of the present invention includes a number of discrete components that enable the transfer of loads from vehicle components to a vehicle chassis, such as the chassis depicted in FIG. 1, at various locations on the chassis. There is particularly described below general purpose anchors 230 and 260, bearing anchor 250 and tangential load anchor 270. These anchors are utilizable in connection with a wide variety of vehicle components, such as to secure suspension elements to an exoskeleton/space frame, as disclosed in U.S. Provisional Patent Application No. 62/736,201, filed Sep. 25, 2018, entitled "Vehicle Suspension" and having the same inventors as the subject application; the contents of which are hereby incorporated by reference into the present disclosure as if fully set forth herein, particularly including the disclosure relating to suspension components using anchoring systems to be secured to an exoskeleton/space frame, as well as the associated anchoring systems. In addition, the contents of U.S. Nonprovisional patent application Ser. No. 16/579,524 entitled "Vehicle Suspension," having the same inventors as the subject application and filed on the same date as the subject application, are hereby incorporated by reference as if fully set forth herein, particularly including the disclosure relating to suspension components using anchoring systems to be secured to an exoskeleton/space frame, as well as the associated anchoring systems, found for example at paragraphs 40-41, 43-56, 57 (sentences 1-3), 58-82 and 100-101, and in FIGS. 1A-13B. There is also described below accessory anchor 360, which provides a further option for securing vehicle components and accessories to a vehicle chassis.

General Purpose Anchor (Two Position) (230)

Figure 2A:
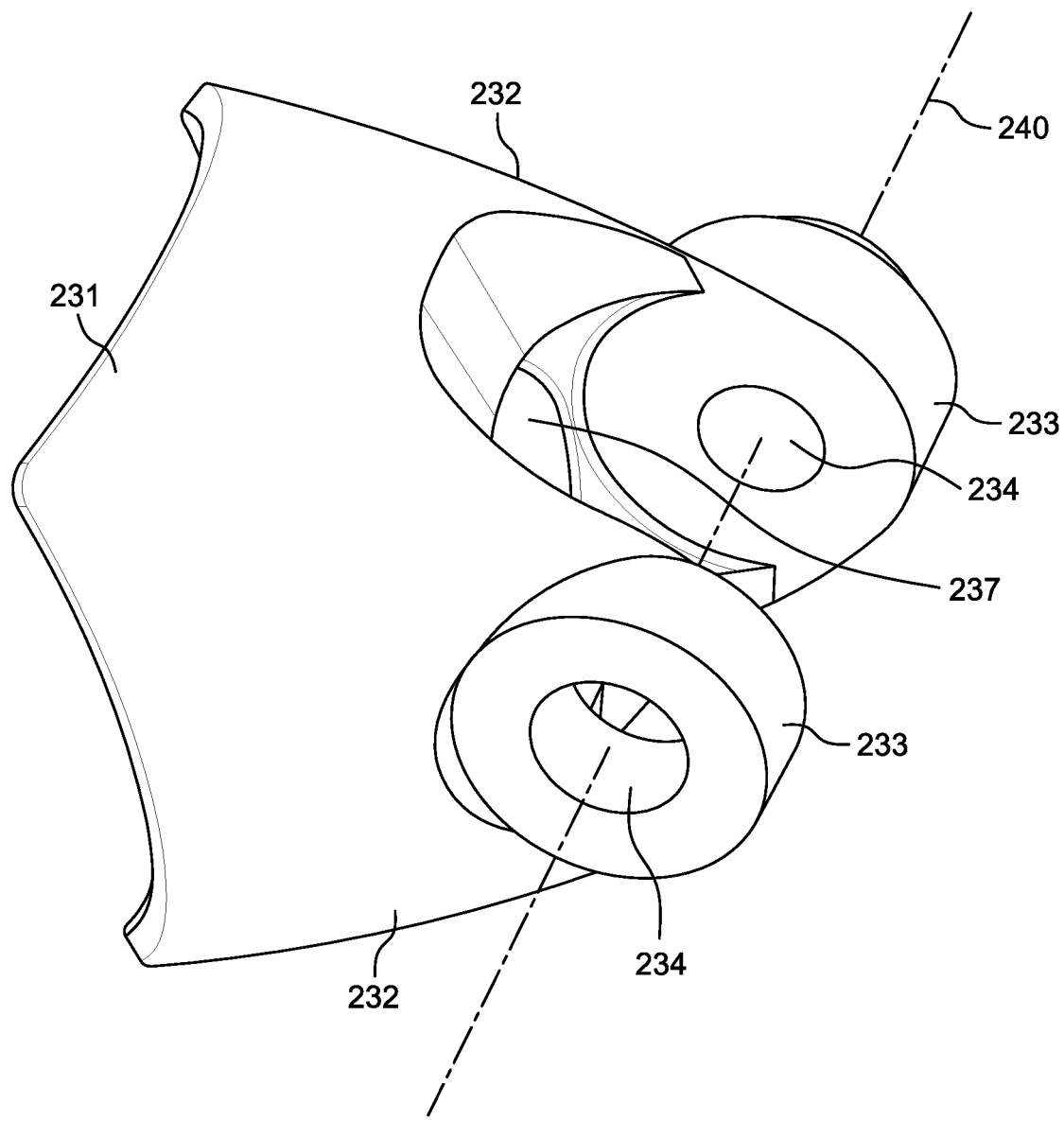
FIG. 2A is a forward perspective view of a two position general purpose anchor in accordance with the present invention.
Figure 2B:
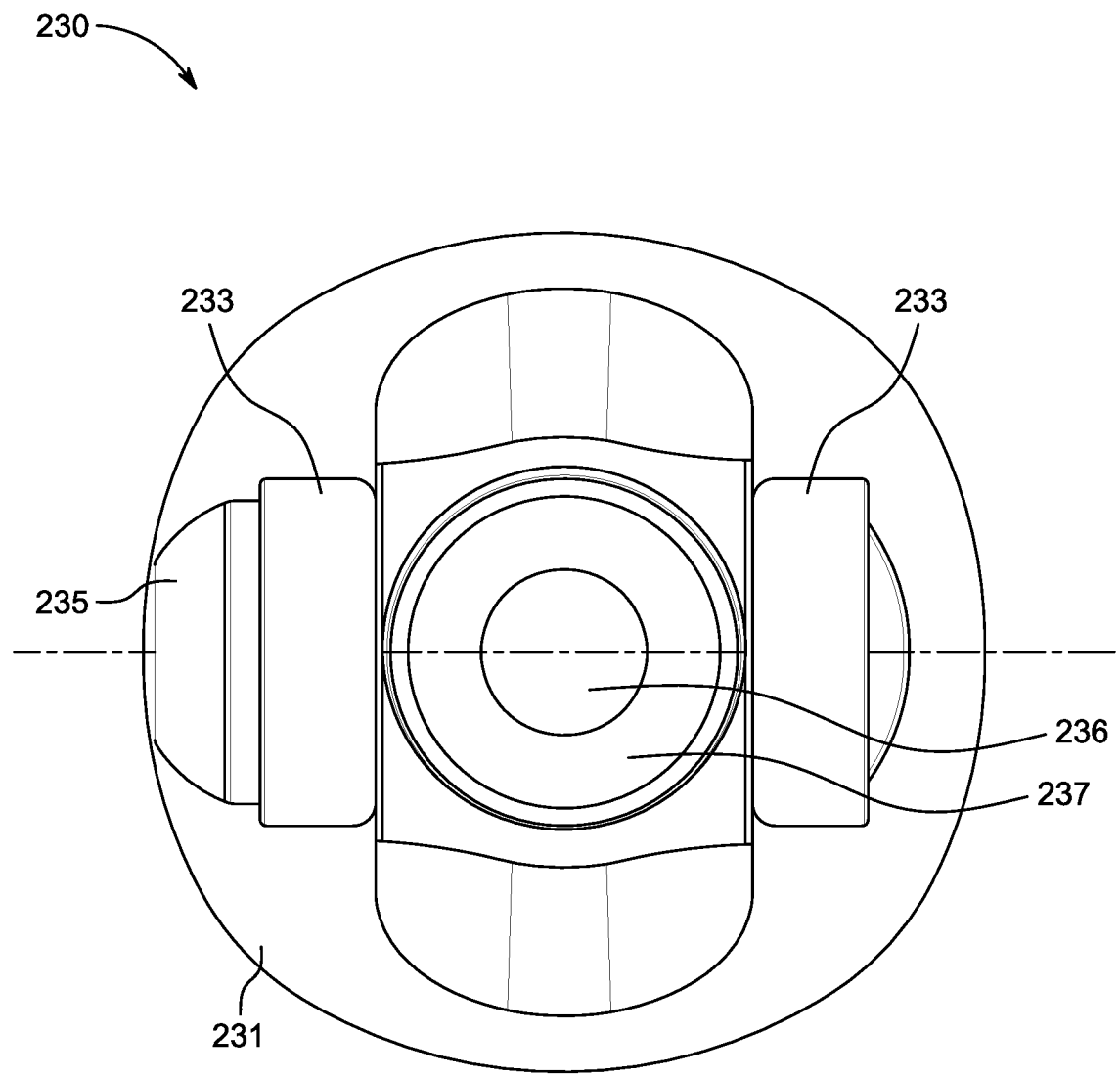
FIG. 2B is a top view of a two position general purpose anchor in accordance with the present invention.

General purpose anchor 230, a forward perspective view of which is shown in FIG. 2A, includes a base 231 from which extends two spaced-apart opposed cheek members 232 whose ends distal from base 231 are provided with circular mounts 233. Mounts 233 are each provided with annular apertures 234, which have a centerline 240, and through which a rod end joint or other vehicle component can be secured with a threaded bolt. An integral locking nut 235 (FIG. 2B) is optionally provided on the exterior face of one of the mounts 233 to facilitate securing the threaded bolt to anchor 230.

Figure 2C:
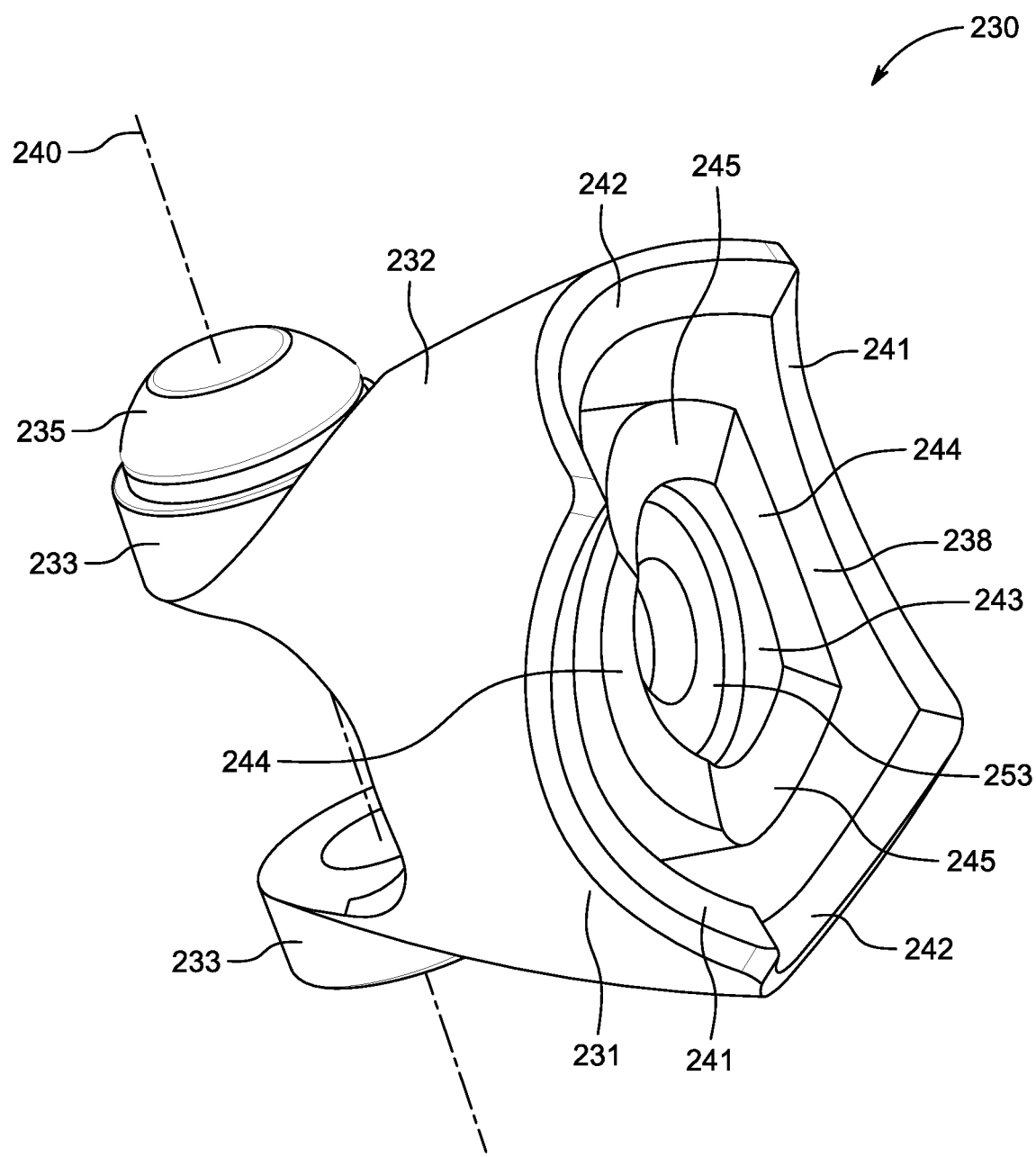
FIG. 2C is a rearward perspective view of a two position general purpose anchor in accordance with the present invention.
Figure 2D:
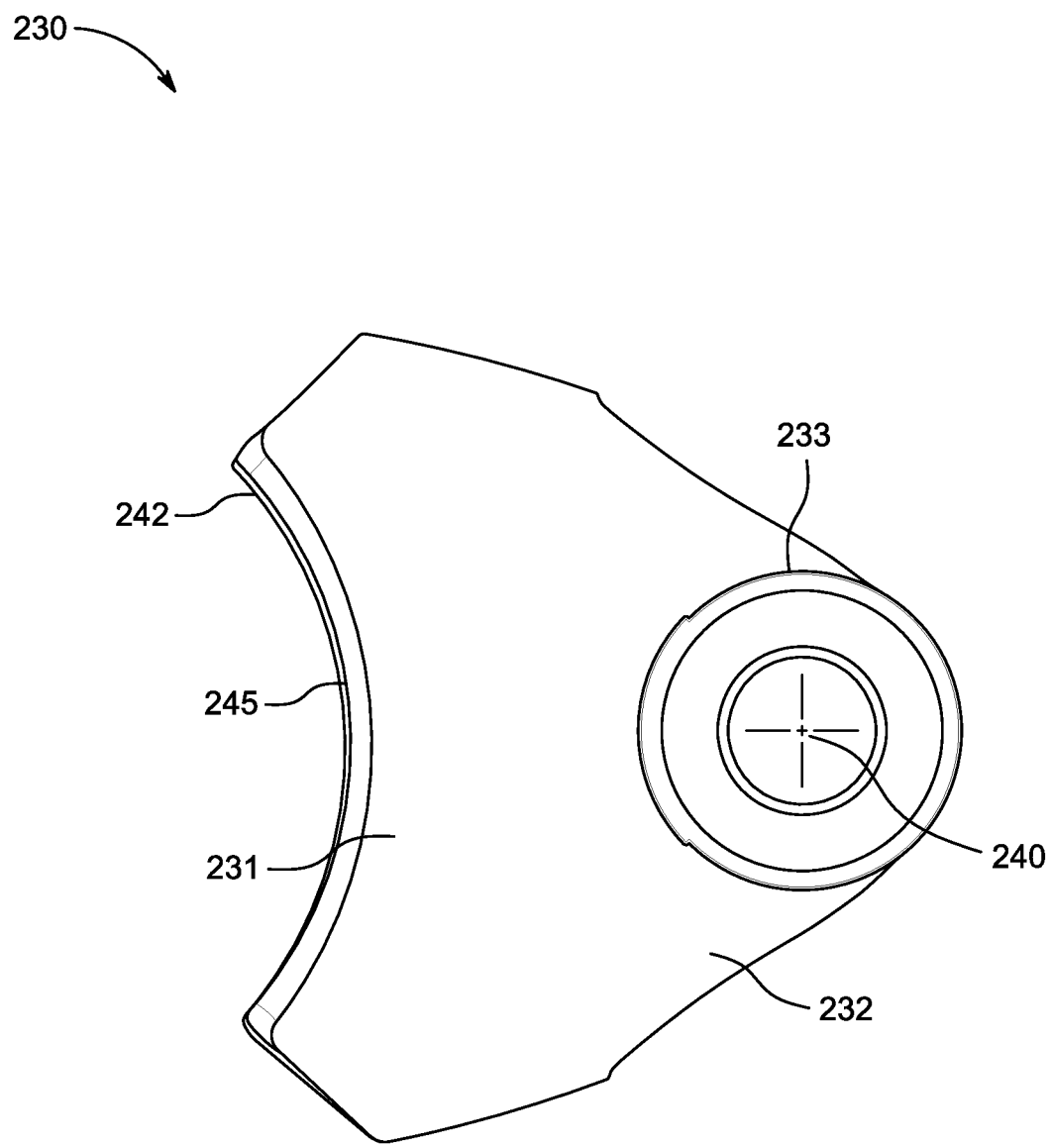
FIG. 2D is a side view of a two position general purpose anchor in accordance with the present invention.
Figure 2E:
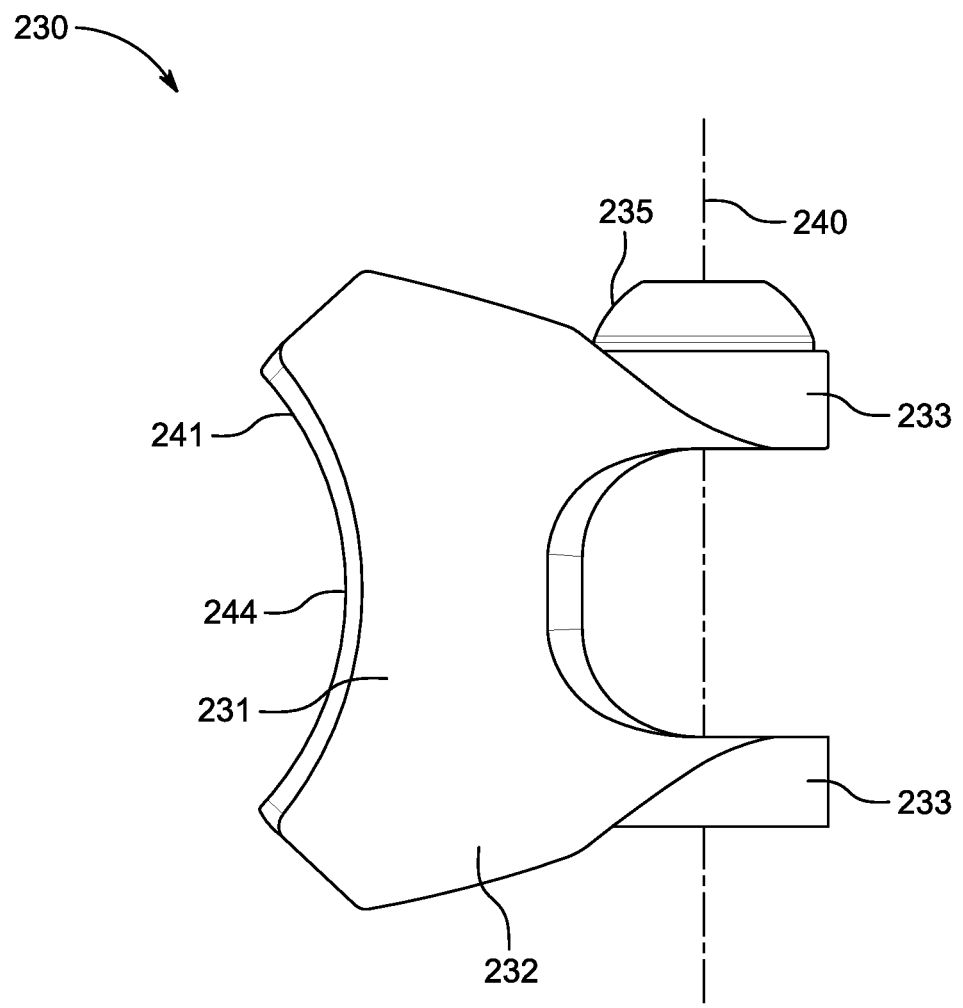
FIG. 2E is a front view of a two position general purpose anchor in accordance with the present invention.
Figure 2F:
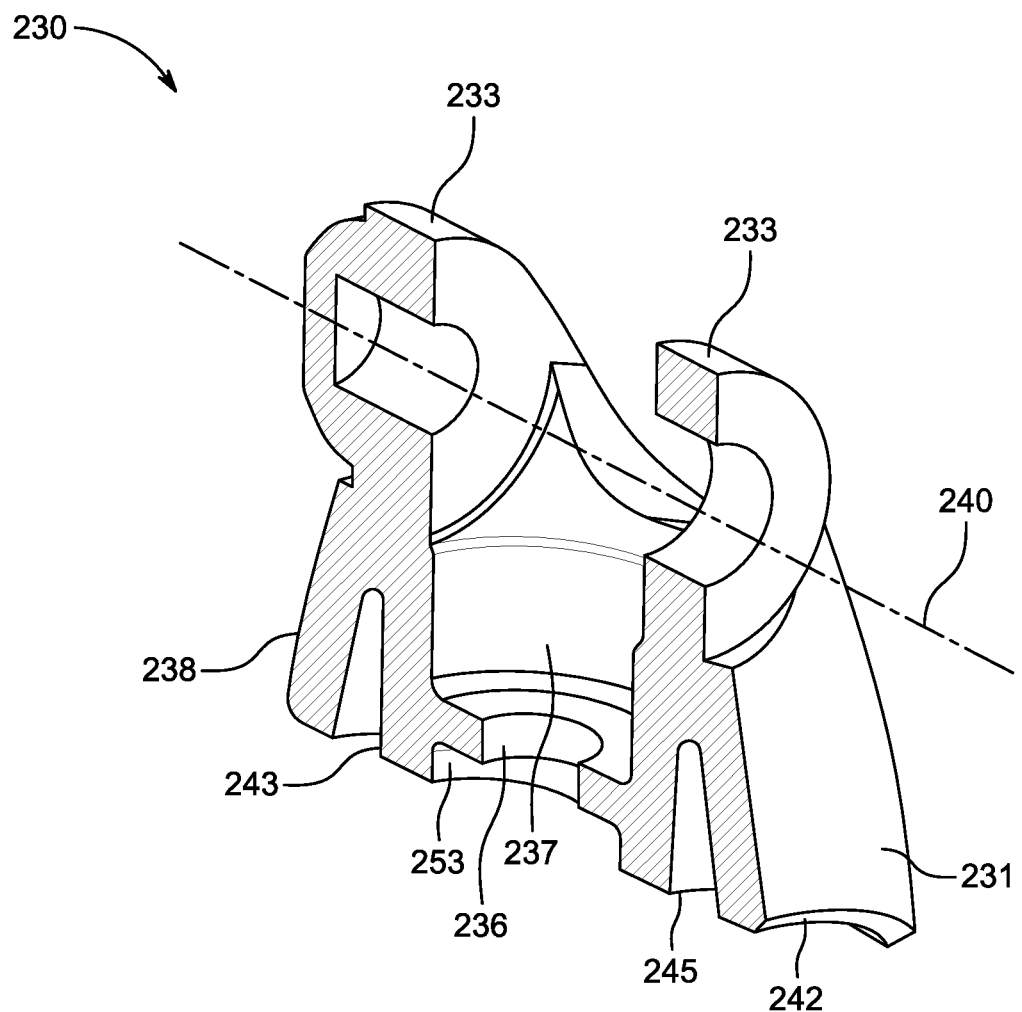
FIG. 2F is a perspective sectional view of a two position general purpose anchor in accordance with the present invention.

Referring to FIG. 2F, the base 231 of anchor 230 is provided with a mounting aperture 236 through which a removable fastener 295 can be placed to secure general purpose anchor 230 to for example a tubular member of an exoskeleton/space frame chassis, preferably utilizing the Securing Elements described further below. There is further provided an annular recess 237 in base 231 to receive a head of fastener 295.

The shape of the portion or portions of base 231 contacting the tubular member or other vehicle component against which anchor 230 is positioned (the "contact elements") can be planar or curved. If the portion of the tubular member or other vehicle component to be in contact with base 231 is planar, then the contact elements can be planar. If the portion of the tubular member or other vehicle component to be in contact with base 231 is curved, then the contact elements can be correspondingly curved.

In one embodiment of the present invention adapted for use with a tubular member that is circular in cross section, base 231 has a load-bearing exterior skirt 238 as shown in FIGS. 2C and 2F, which is to be placed in contact with a chassis tubular member. Exterior skirt 238 terminates with two pairs of concavely shaped spaced-apart opposed arcuate cut-outs 241 and 242, each pair perpendicular to the other and having a curvature that generally conforms to the outside diameter of the tubular member to which anchor 230 is secured. Base 231 also includes a load-bearing interior skirt 243, circumscribed by exterior skirt 238, which terminates with two pairs of concavely shaped spaced-apart opposed arcuate cut-outs 244 and 245, each pair perpendicular to the other and having a curvature that generally conforms to the outside diameter of the tubular member to which anchor 230 is secured. Skirts 238 and 243 preferably are dimensioned to be in flush contact with the exterior surface of a tubular member when anchor 230 is positioned against the tubular member. Exterior skirt 238 and interior skirt 243 each has a thickness and construction to be able to bear compressive loads which are primarily imposed upon it by fastener 295 and from other vehicle components through mounts 233 and cheek members 232.

The provision of two pairs of cut-outs 241 and 242 on exterior skirt 238 and two pairs of cut-outs 244 and 245 on interior skirt 243 facilitates positioning anchor 230 in two different orientations: a first orientation where centerline 240 is generally parallel to the axis of the tubular member on which it is mounted, and a second orientation where centerline 240 is rotated approximately 90° from the first orientation to be generally perpendicular to the axis of the tubular member on which it is mounted. This permits orienting the mounts 233 and their apertures 234 in accordance with the alignment of the fastening points of the vehicle component at issue.

General purpose anchor 230 is useful for securing a wide variety of components to a vehicle chassis, such as suspension components.

General Purpose Anchor (One Position) (260)

Figure 2G:
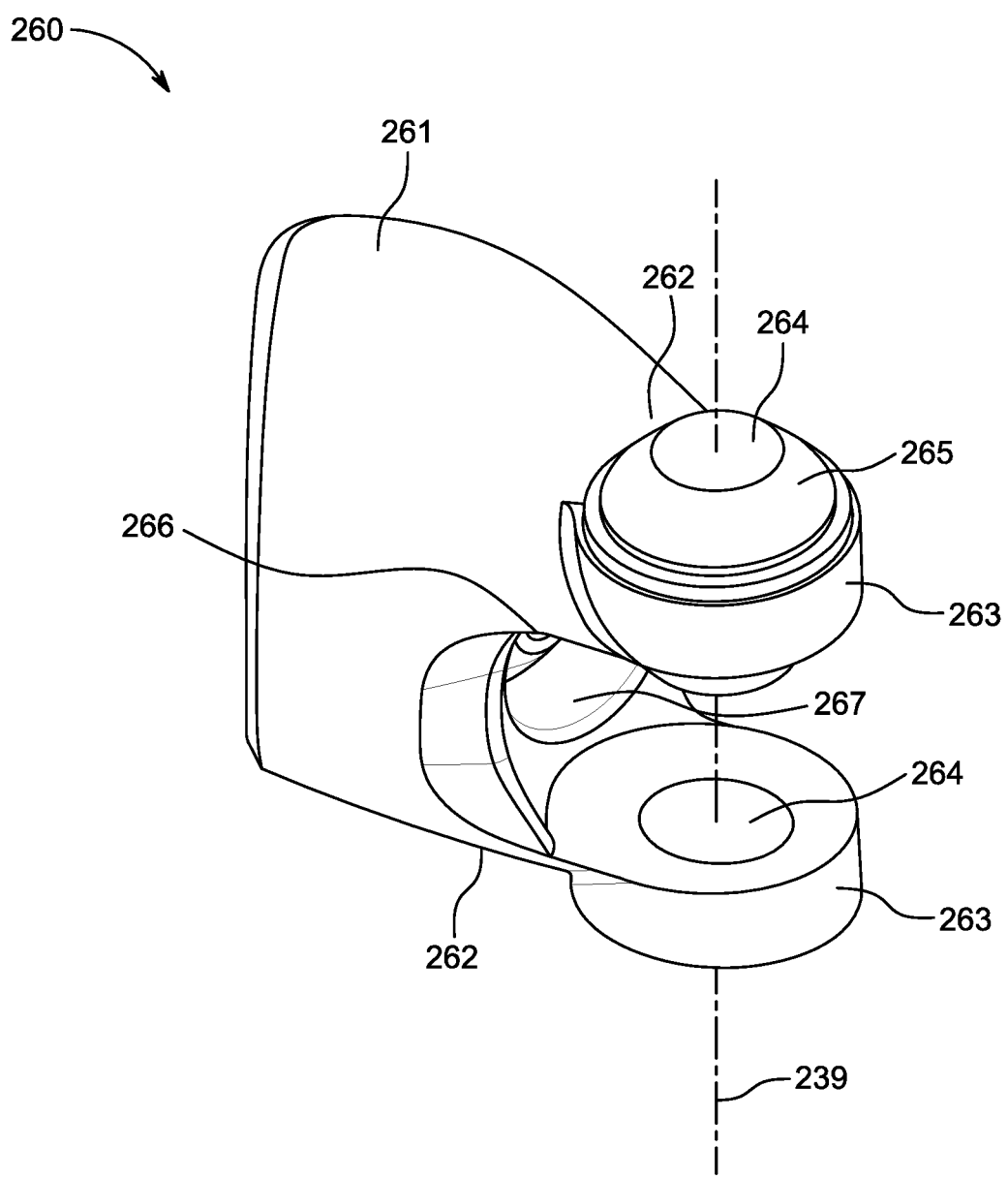
FIG. 2G is a perspective view of a one position general purpose anchor in accordance with the present invention.

General purpose anchor 260, a forward perspective view of which is shown in FIG. 2G, is similar to general purpose anchor 230, except that anchor 260 is designed to be used in one orientation only.

Figure 2H:
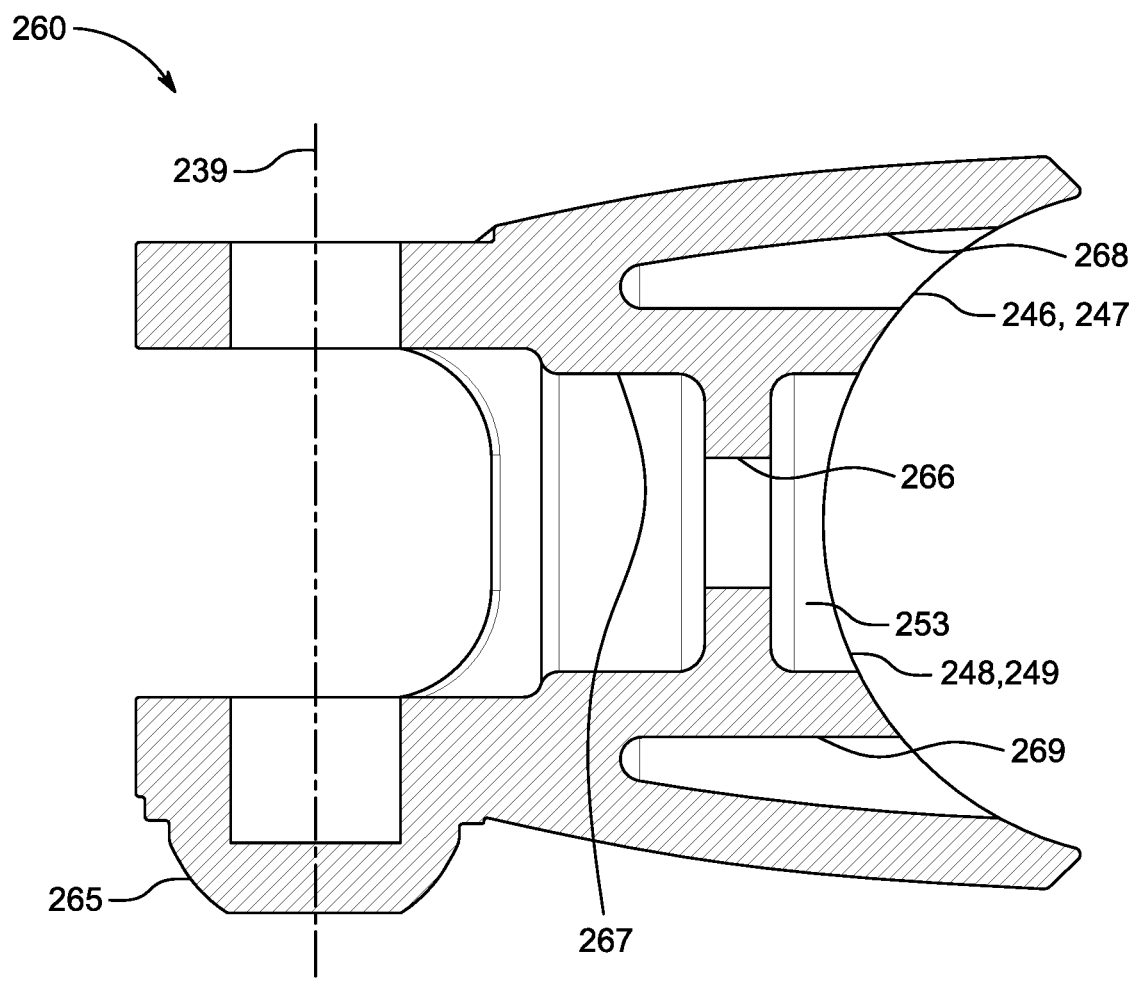
FIG. 2H is a front sectional view of a one position general purpose anchor in accordance with the present invention.

As shown in FIGS. 2G and 2H, general purpose anchor 260 includes a base 261 from which extends two spaced-apart opposed cheek members 262 whose ends distal from base 261 are provided with circular mounts 263. Mounts 263 are each provided with annular apertures 264, which have a centerline 239, and through which a rod end joint or other vehicle component can be secured with a threaded bolt. An integral locking nut 265 is optionally provided on the exterior face of one of the mounts 263 to facilitate securing the threaded bolt to anchor 260.

Referring to FIGS. 2G and 2H, the base 261 of anchor 260 is provided with a mounting aperture 266 through which a removable fastener 295 can be placed to secure general purpose anchor 260 to for example a tubular member of an exoskeleton/space frame chassis, preferably utilizing the Securing Elements described further below. There is further provided an annular recess 267 in base 261 to receive a head of fastener 295.

The shape of the contact elements of base 261 can be planar or curved. If the portion of the tubular member or other vehicle component to be in contact with base 261 is planar, then the contact elements can be planar. If the portion of the tubular member or other vehicle component to be in contact with base 261 is curved, then the contact elements can be correspondingly curved.

In one embodiment of the present invention adapted for use with a tubular member that is circular in cross section, base 261 has a load-bearing exterior skirt 268 as shown in FIG. 2H, which is to be placed in contact with a chassis tubular member. Exterior skirt 268 terminates with one pair of concavely shaped spaced-apart opposed arcuate cut-outs 246 and 247, each having a curvature that generally conforms to the outside diameter of the tubular member to which anchor 260 is secured. Base 261 also includes a load-bearing interior skirt 269, circumscribed by exterior skirt 268, which terminates with one pair of concavely shaped spaced-apart opposed arcuate cut-outs 248 and 249, each having a curvature that generally conforms to the outside diameter of the tubular member to which anchor 260 is secured. Skirts 268 and 269 preferably are dimensioned to be in flush contact with the exterior surface of a tubular member when anchor 260 is positioned against the tubular member. Exterior skirt 268 and interior skirt 269 each has a thickness and construction to be able to bear compressive loads which are primarily imposed upon it by fastener 295 and from other vehicle components through mounts 263 and cheek members 262.

As illustrated, the distance between centerline 239 and the contact elements of base 261 (of anchor 260) are greater than between centerline 240 and the contact elements of base 231 (of anchor 230). Thus general purpose anchor 260 provides more clearance above the tubular member on which it is mounted than general purpose anchor 230. In general, the clearance distance of the anchors of the present invention above the chassis component on which they are mounted is a matter of design choice depending on, for example, the shape and size of the component mounted to the anchor, and the magnitude and direction of the force vector that is to be borne. Also in the embodiment of general purpose anchor 260 shown, the centerline 239 of circular mounts 263 is generally perpendicular to the axis of the tubular member on which anchor 260 is mounted. However, it is also possible to orient arcuate cut-outs 246-249 so that centerline 239 is generally parallel to the axis of the tubular member on which anchor 260 is mounted, in accordance with design preference.

General purpose anchor 260 is useful for securing a wide variety of components to a vehicle chassis, such as shock absorbers or other suspension components.

Bearing Anchor (250)

Figure 3A:
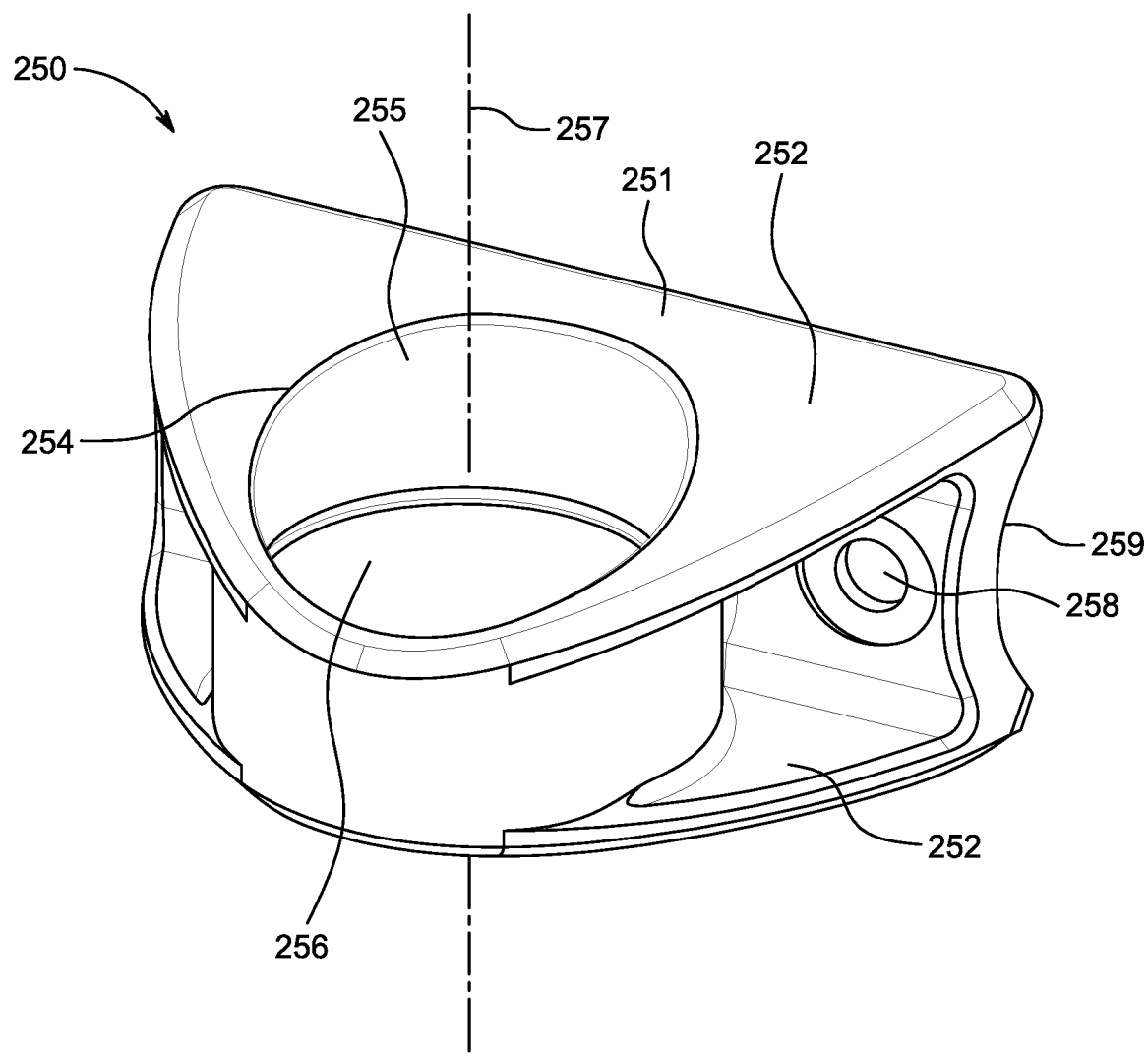
FIG. 3A is a perspective view of a bearing anchor in accordance with the present invention.
Figure 3B:
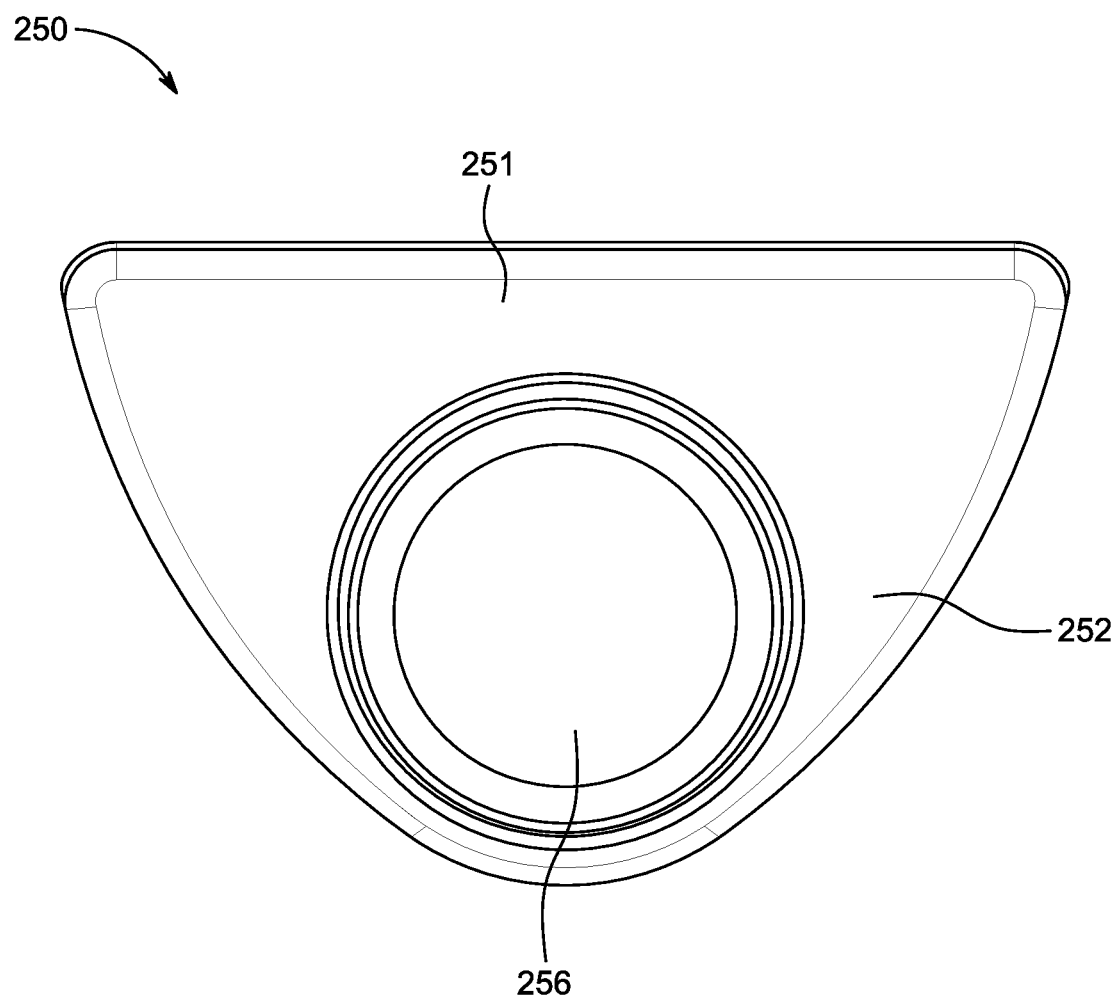
FIG. 3B is a front view of a bearing anchor in accordance with the present invention.
Figure 3C:
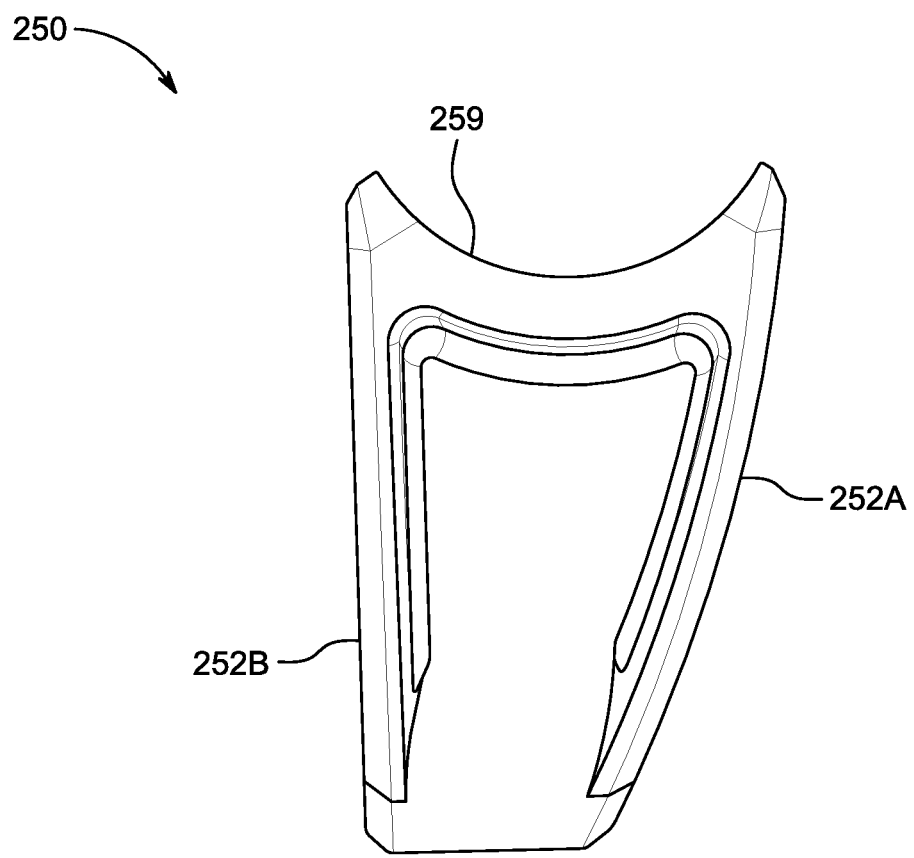
FIG. 3C is a side view of a bearing anchor in accordance with the present invention.
Figure 3D:
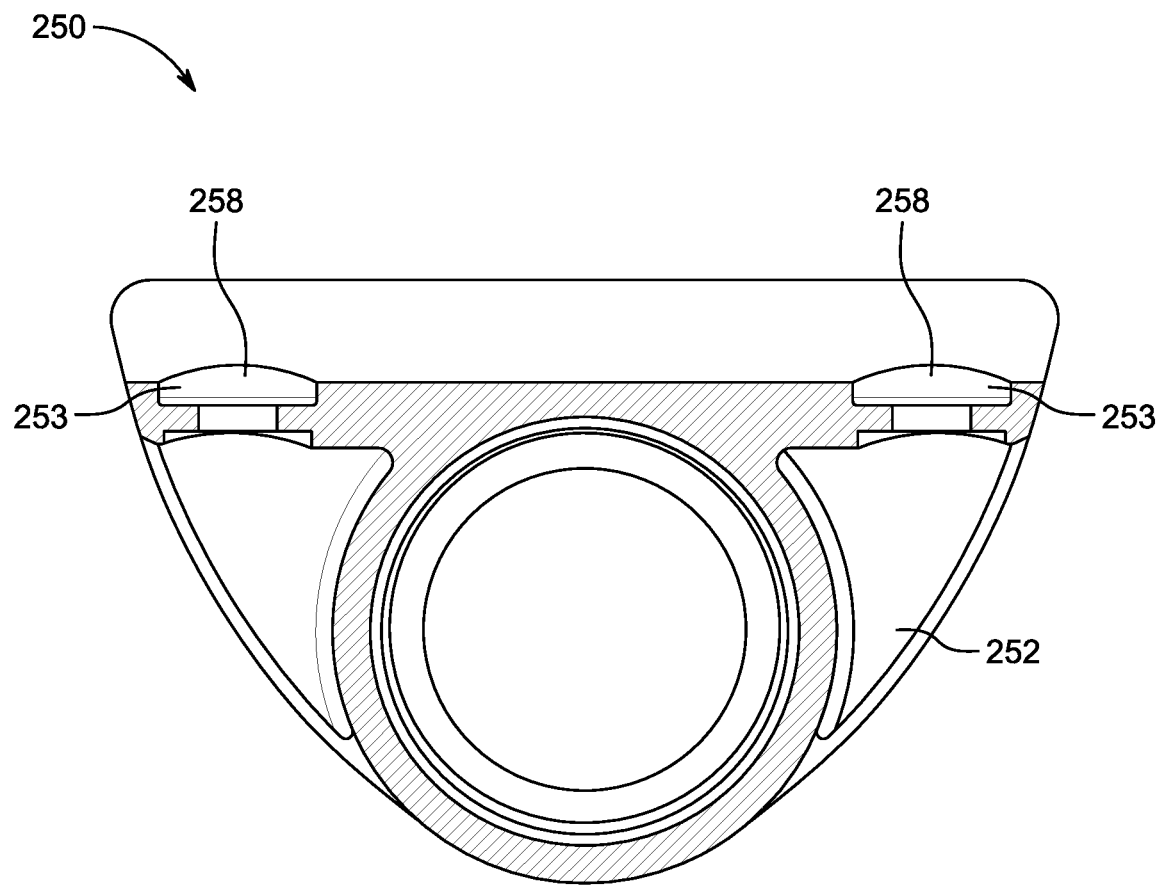
FIG. 3D is a front sectional view of a bearing anchor in accordance with the present invention.

Bearing anchor 250, a perspective view of which is shown in FIG. 3A, includes a base 251 from which extends two opposed spaced-apart crescent-shaped cheek plates 252, which are each provided with an annular aperture 254. The apertures 254 are joined by a cylindrical shroud 255 to define a closed through-recess 256, having a centerline 257, dimensioned so that a vehicle component, particularly a friction-reducing roller or ball bearing assembly, can be press-fitted or otherwise secured therein. Referring to FIGS. 3A and 3D, the base 251 of bearing anchor 250 is provided with two spaced-apart mounting apertures 258 into which removable fasteners 295 can be placed to secure general purpose anchor 260 to for example a tubular member of an exoskeleton/space frame chassis, preferably utilizing the Securing Elements described further below.

The shape of the contact elements of base 251 can be planar or curved. If the portion of the tubular member or other vehicle component to be in contact with base 251 is planar, then the contact elements can be planar. If the portion of the tubular member or other vehicle component to be in contact with base 251 is curved, then the contact elements can be correspondingly curved.

In one embodiment of the present invention adapted for use with a tubular member that is circular in cross section, base 251 includes a concave load-bearing channel 259 having a curvature that generally conforms to the outside diameter of the chassis tubular member to which anchor 250 is secured. In the event that the width of shroud 255 (when measured along centerline 257) need not be as wide as the distance across channel 259, one of cheek plates 252 (denominated 252A in FIG. 3C) can be curved toward the other of cheek plates 220 (denominated 252B in FIG. 3C) as the distance from base 210 increases. Alternatively, both cheek plates 252 can be curved toward each other as the distance from base 210 increases, in accordance with design preference.

Bearing anchor 250 is useful for securing within through-recess 256 a roller or ball bearing assembly which receives a rotating shaft, as found for example with a bell crank, lever arm or other rotationally supported suspension linkage.

Tangential Load Anchor (270)

Figure 4A:
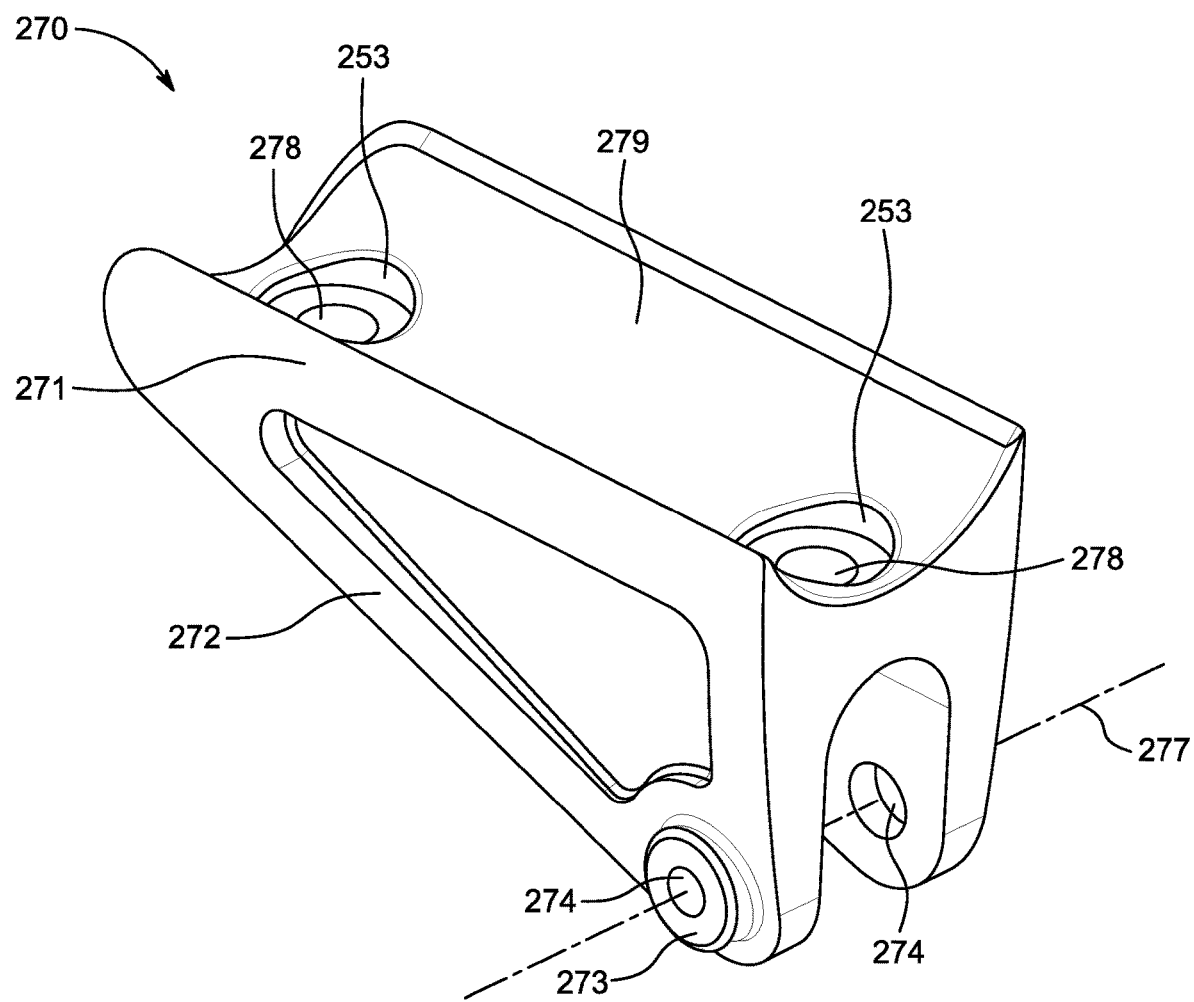
FIG. 4A is a perspective view of a tangential load anchor in accordance with the present invention.
Figure 4B:
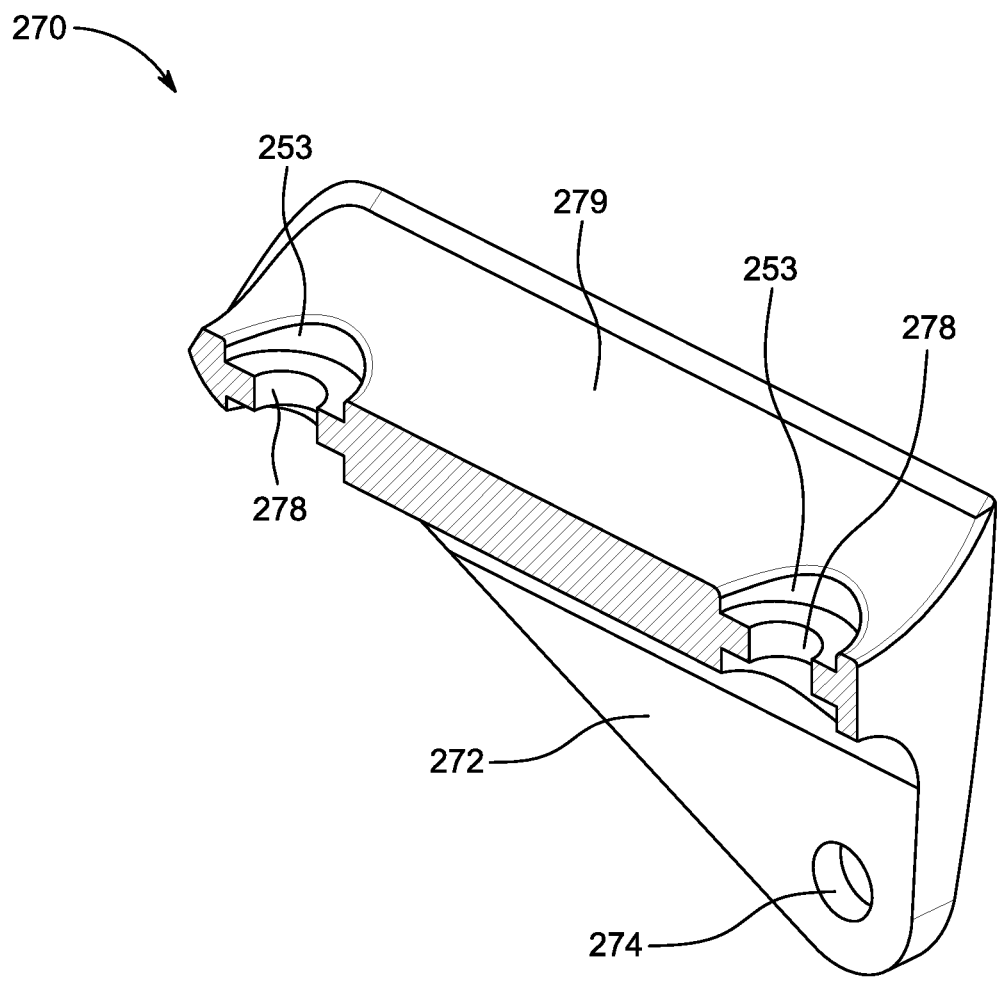
FIG. 4B is a perspective sectional view of a tangential load anchor in accordance with the present invention.
Figure 4C:
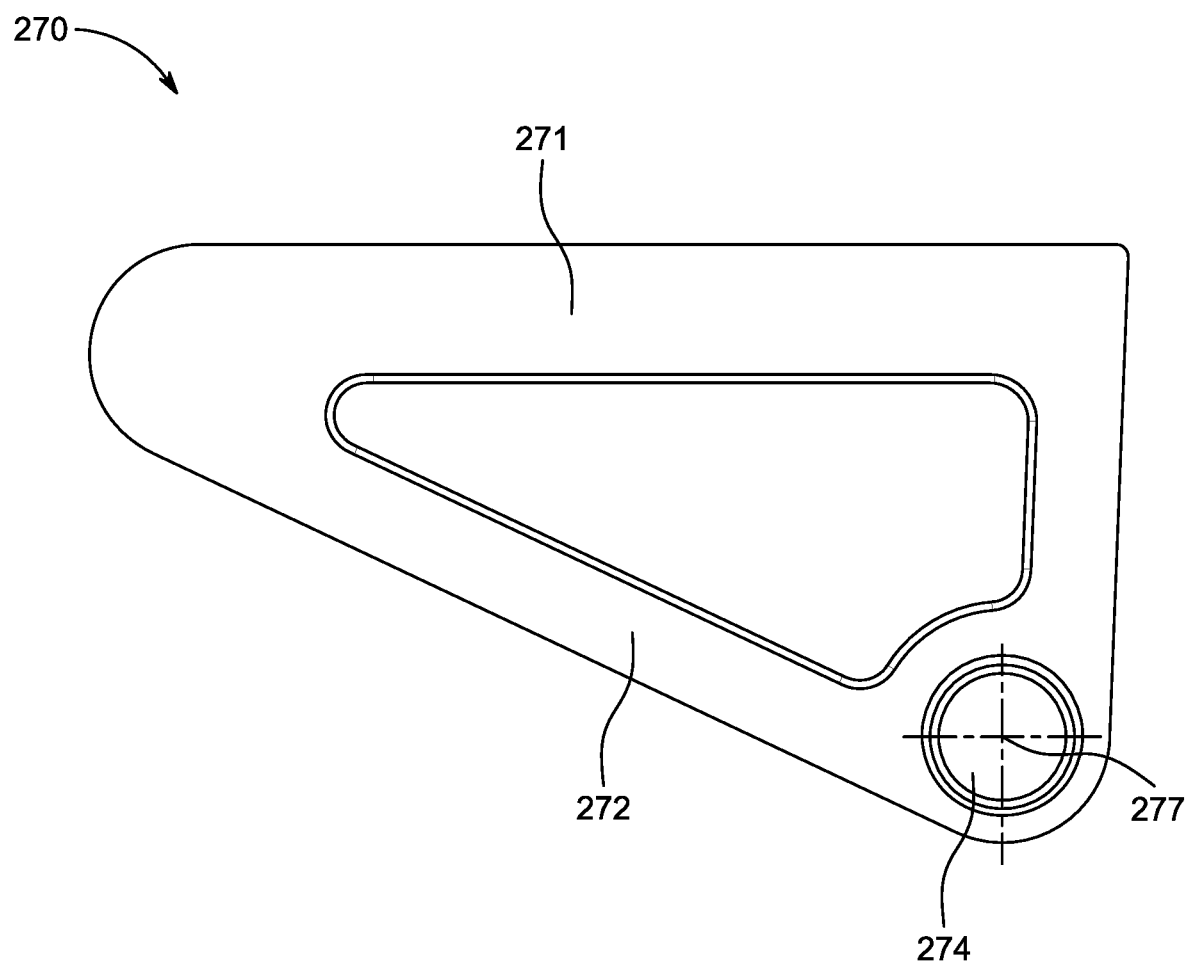
FIG. 4C is a front view of a tangential load anchor in accordance with the present invention.
Figure 4D:
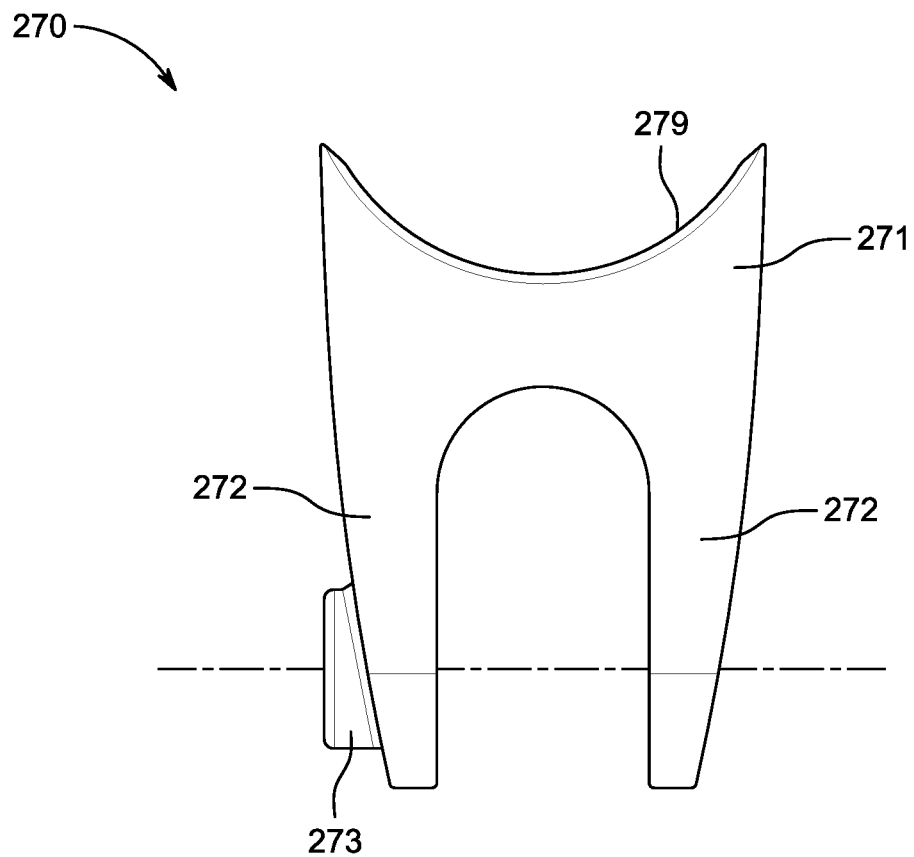
FIG. 4D is a side view of a tangential load anchor in accordance with the present invention.

Tangential load anchor 270, as shown in the perspective views of FIGS. 4A and 4B, includes a base 271 from which extends two spaced-apart opposed generally triangular cheek plates 272, shown for example in FIGS. 4C and 4D. The ends of plates 272 distal from base 271 are each provided with annular apertures 274, which have a centerline 277, and through which a rod end joint or other vehicle component can be secured with a threaded bolt. An integral locking nut 273 is optionally provided on the exterior face of one of the cheek plates 272 to facilitate securing the threaded bolt to anchor 270. Referring to FIGS. 4A and 4B, the base 271 of tangential load anchor 270 is provided with two spaced-apart mounting apertures 278 into which removable fasteners 295 can be placed to secure general purpose anchor 270 to for example a tubular member of an exoskeleton/space frame chassis, preferably utilizing the Securing Elements described further below.

The shape of the contact elements of base 271 can be planar or curved. If the portion of the tubular member or other vehicle component to be in contact with base 271 is planar, then the contact elements can be planar. If the portion of the tubular member or other vehicle component to be in contact with base 271 is curved, then the contact elements can be correspondingly curved.

In one embodiment of the present invention adapted for use with a tubular member that is circular in cross section, base 271 includes a concave load-bearing channel 279 having a curvature, as shown for example in FIG. 4D, which generally conforms to the outside diameter of the chassis tubular member to which anchor 270 is secured.

Tangential load anchor 270 is useful for securing a component that generates force largely parallel to the tubular member to which load anchor 300 is secured, such as shock absorbers or other suspension components.

Securing Elements

The elements used to secure any of anchors 230, 250, 260, 270 and 360 (described below) to the tubular member of a vehicle chassis are described below with respect to general purpose anchor 230, although the description equally applies to anchors 250, 260, 270 and 360 as well.

Figure 6:
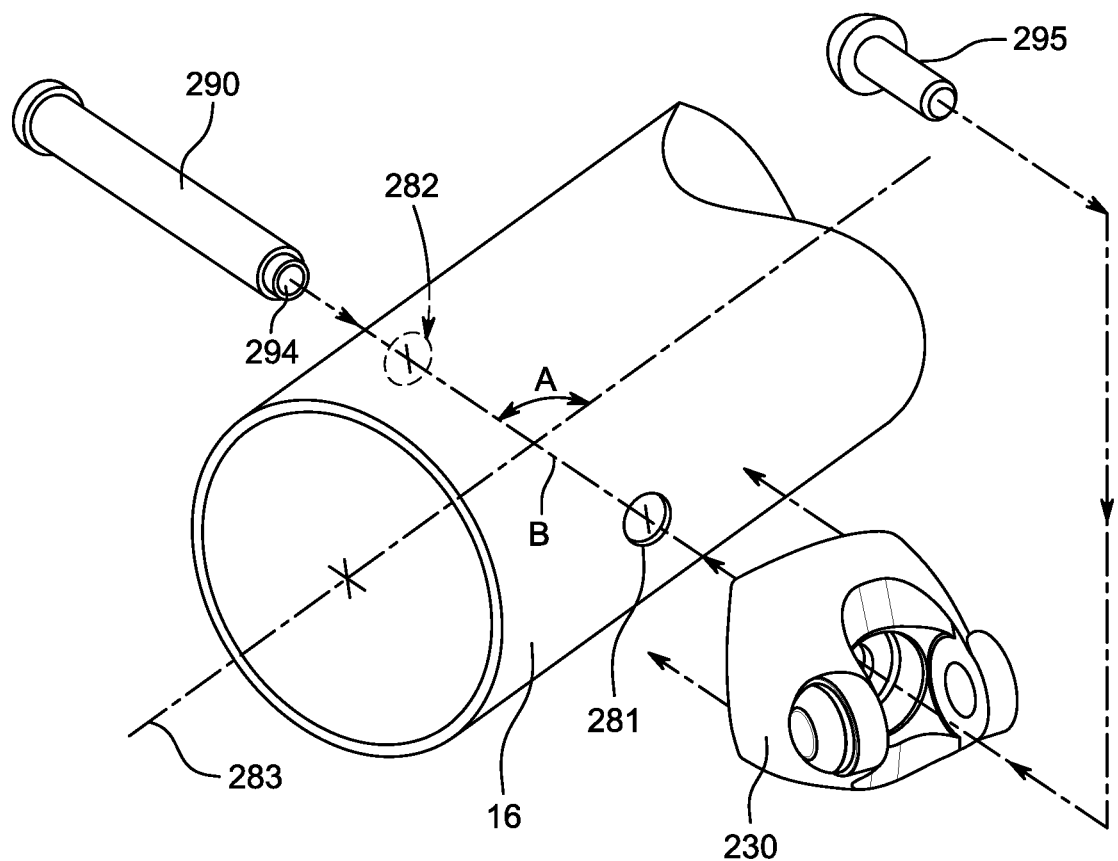
FIG. 6 shows a portion of a tubular member and the elements utilized to mount a general purpose anchor of the present invention to the tubular member.

To secure general purpose anchor 230 to exemplary tubular member 16, a portion of which is shown in FIG. 6, two opposed circular tube apertures 281, 282 are formed in tubular member 16. Apertures 281, 282 are generally orthogonal to the axial centerline 283 of member 16, as shown in FIG. 6 (Angle A is approximately 90°), and are located along a diameter B (FIG. 6) of tubular member 16.

Figure 5A:
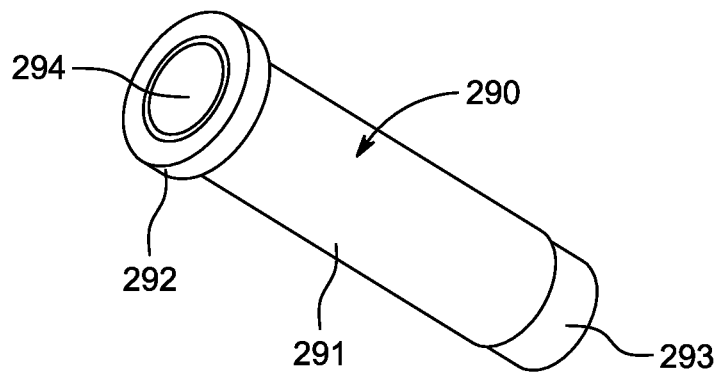
FIGS. 5A and 5B are perspective and front views of a boss in accordance with the present invention.
Figure 5B:
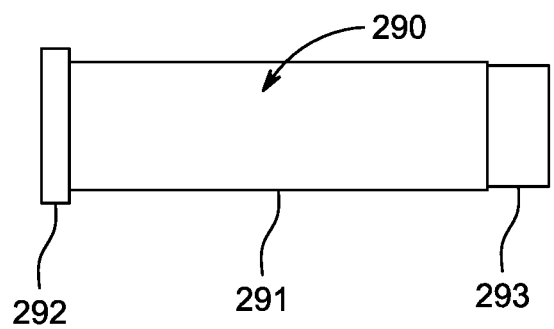

FIGS. 5A and 5B depict an anchor securing element, boss 290, which is a cylindrical member inserted through apertures 281, 282 shown in FIG. 6. Boss 290 has a shaft 291 that terminates in a flanged end 292. The length and diameter of boss 290 can be varied in accordance with the particular application for which it is used. As a general design rule, the length of shaft 291 should be approximately the same as, or greater than, the outside diameter of tubular member 16, such that it extends through tubular member 16 when inserted through apertures 281, 282 and the flanged end 292 is positioned against the outer surface of tubular member 16. Preferably, countersinks 253 (see, e.g., FIG. 2F, 2H, 3D, 4A)

are provided so that anchors 230, 250, 260 and 270 can sit flush against the surface of tubular member 16 in the event the end of shaft 291 distal from flanged end 292 protrudes beyond the surface of tubular member 16 when boss 290 is inserted through apertures 281, 282.

The end of boss 290 distal from flanged end 292, stepped end 293, preferably has a reduced diameter as compared to the diameter of shaft 291 between flanged end 292 and stepped end 293. The diameter of tube aperture 281 preferably is smaller than the diameter of tube aperture 282. Further, it is preferred that the diameter of shaft 291 between flanged end 292 and stepped end 293 be greater than the diameter of tube aperture 281 and slightly less than the diameter of tube aperture 282, and it is preferred that the diameter of stepped end 293 be slightly less than the diameter of tube aperture 281.

In accordance with the foregoing design preferences, boss 290 is self-aligning; i.e., boss 290 can be inserted into apertures 281, 282 from one direction only, and only up to the point where flanged end 292 comes into contact with the surface of tubular member 16. Therefore, utilizing a self-aligning anchor securing element, which in the preferred embodiment is boss 290 with the design features disclosed herein, facilitates component assembly and provides a measure of quality control during component assembly.

It is preferred that boss 290 be welded in place to tubular member 16, at flanged end 292 and at stepped end 293, to permanently fix it in place. Alternatively, boss 290 can be left unsecured to tubular member 16, relying on flanged end 292 to maintain it in proper position until the anchor/boss assembly is secured into place.

In an alternative embodiment of boss 290, flanged end 292 and stepped end 293 are omitted, such that shaft 291 of boss 290 is of generally uniform diameter along its length. In conjunction with this alternative embodiment, apertures 281, 282 can have the same diameter, sized to received shaft 291. Boss 290 in this alternative embodiment can then be inserted into tubular member 16 through either of apertures 281, 282. Given the omission of flanged end 292 in this embodiment, it is preferable to permanently fix boss 290 in place, as by welds at one or both of apertures 281, 282.

Boss 290 also has a bore 294 for receiving a removable fastener 295, such as a threaded bolt. Bore 294 can be threaded or smooth. If bore 294 is threaded, fastener 295 should be correspondingly threaded to permit fastener 295 to be secured tightly to boss 290. If bore 294 is smooth, fastener 295 should be of a length larger than the outside diameter of tube 16, such that when inserted in bore 294, the portion of fastener 295 protruding beyond tube 16 can be secured, such as by threading the protruding portion and securing it with a corresponding nut.

After boss 290 is placed in position in apertures 281, 282, general purpose anchor 230 is positioned in place against tube member 16, with mounting aperture 236 superposed in the preferred embodiment over tube aperture 281. As shown in FIG. 6, fastener 295 is then inserted through mounting aperture 236 of general purpose anchor 230 and tube aperture 281. Fastener 295 is thereafter fixed in position relative to the structure of tubular member 16; thus if bore 294 is threaded, fastener 295 is tightened to firmly secure general purpose anchor 230 in place. In the event the component to which anchor 230 is secured is to be relocated or eliminated, the fastener 295 is simply removed from bore 294 as by unthreading, and anchor 230 is removed, leaving no significantly protruding remnants.

The fastening and removal of anchors 250, 260, 270 and 360 to a tubular member is accomplished in the same manner, except that in the case of anchors 250 and 270 two bosses 290 and two fasteners 295 are positioned in tube apertures 281, 282.

Accessory Anchor (360)

Accessory anchor 360, shown in FIGS. 7A-7D, differs from anchors 230, 250, 260 and 270 in that anchor 360 is secured to two opposing sides of a tubular member.

Figure 7A:
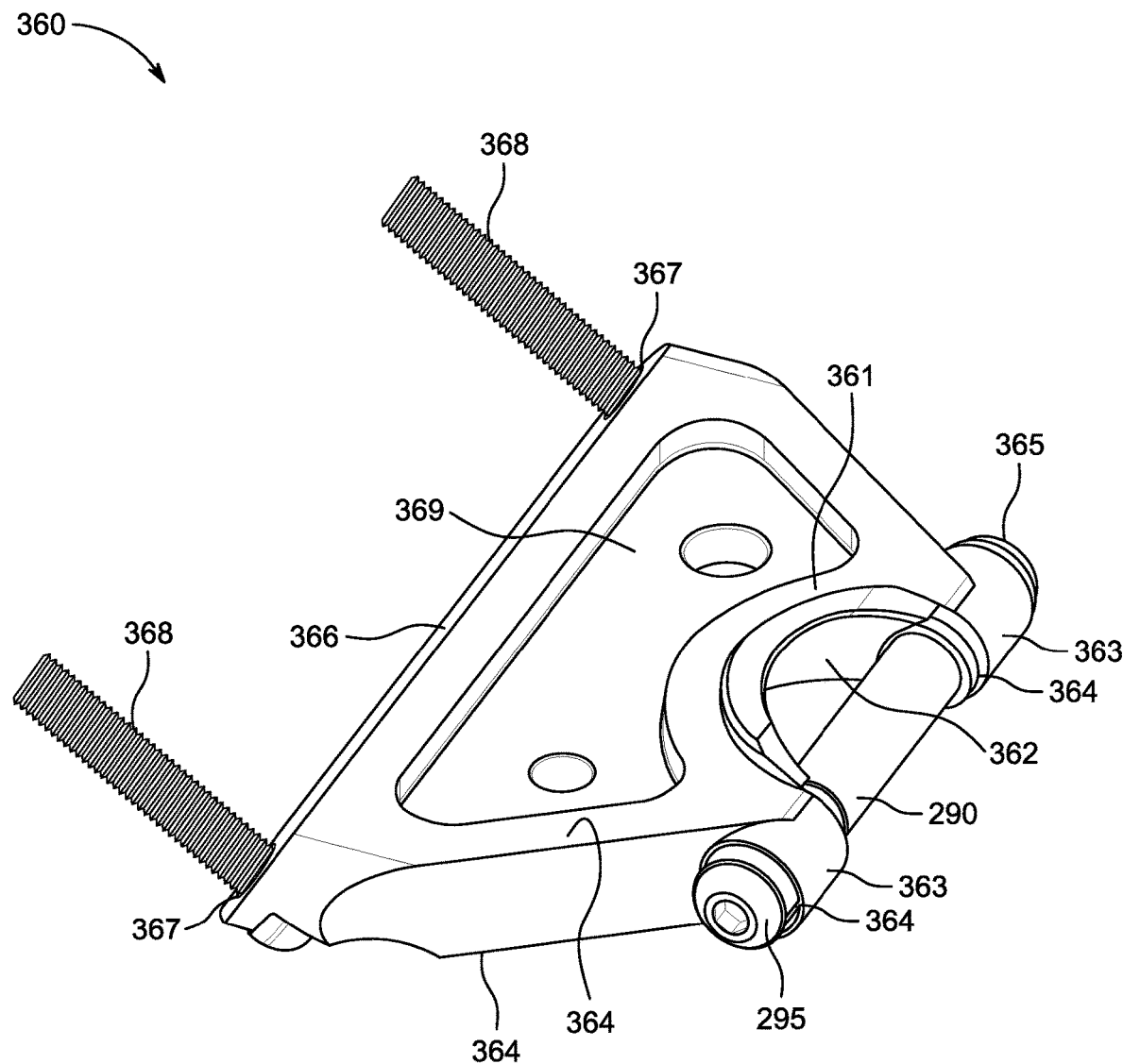
FIG. 7A is a perspective front view of an accessory anchor, including a boss and fastener assembly, and accessory mounting bolts.

Referring to FIG. 7A, accessory anchor 360 includes a support yoke 361 having two opposed fastening mounts 363, mounts 363 each defining an annular mounting aperture 364. The distance between fastening mounts 363 preferably is slightly greater than the cross-sectional width of the tubular member to which anchor 360 will be fastened, so as to provide a removable yet snug fit between the tubular member and accessory anchor 360. Anchor 360 is to be fastened to a tubular member received in support yoke 361 and can be secured using apertures 364 and a removable fastener 295, preferably utilizing the Securing Elements described above. In that connection, a boss 290 and a fastener 295 are illustrated in their proper positions in FIGS. 7A, 7C and 7D. An integral lock nut 365 is optionally provided to which fastener 295 can be secured.

Figure 7B:
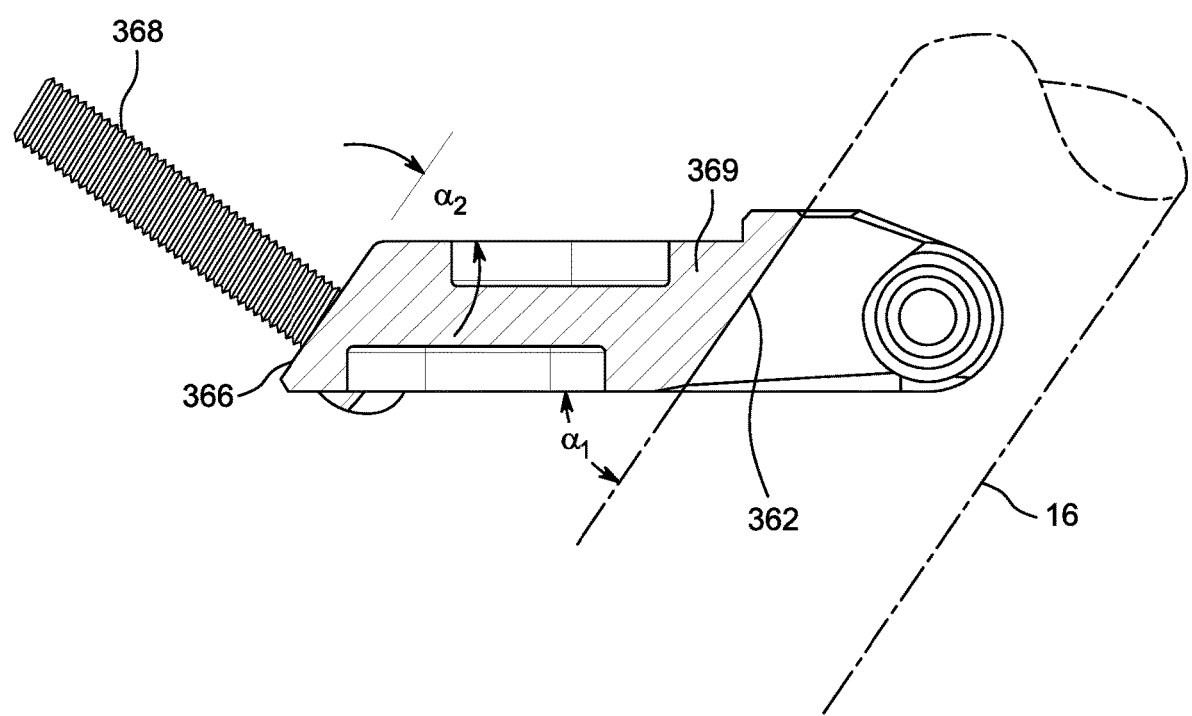
FIG. 7B is a side sectional view of an accessory anchor, when sectioned into two equal halves in the manner shown in FIG. 7D.
Figure 7C:
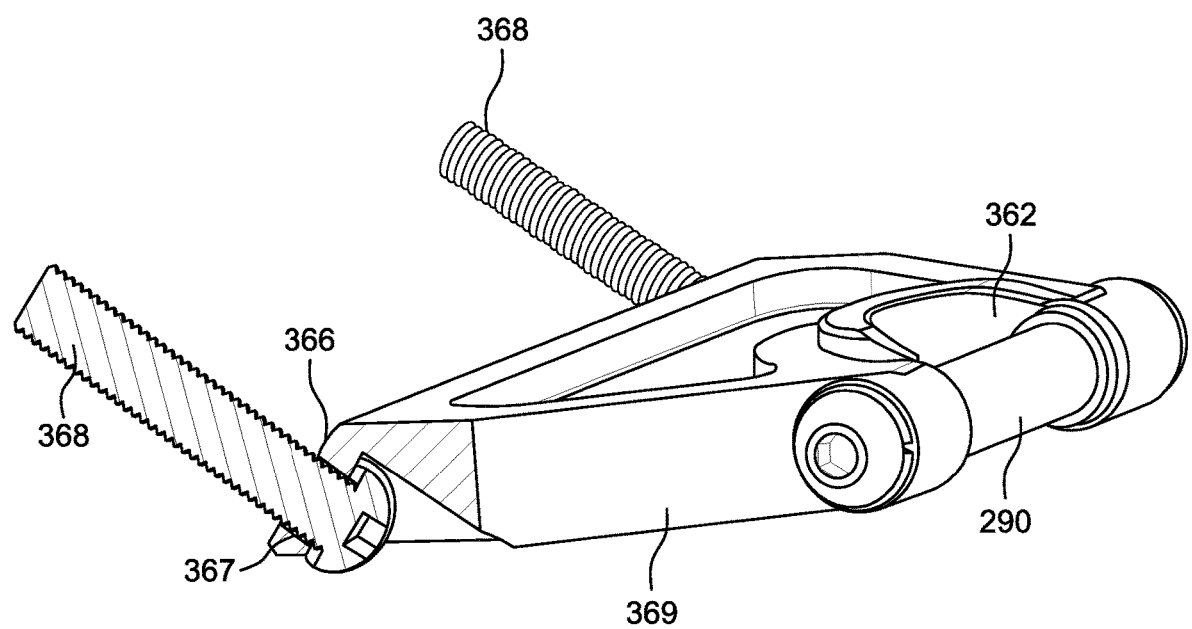
FIG. 7C is a perspective sectional view of an accessory anchor, including a boss and fastener assembly, accessory mounting bolts, and sectioned through an accessory mounting aperture.

Support yoke 361 is joined to a support strut 369, which has two opposed generally planar anchor faces 364, each approximately parallel to the other. Support strut 369 is joined to an accessory mounting surface 366 distal from support yoke 361, as shown for example in FIG. 7A. Accessory mounting surface 366 defines two accessory mounting apertures 367 (e.g., FIGS. 7C and 7D), which are shown in the figures provided with accessory mounting bolts 368 for illustrative purposes.

Where accessory anchor 360 is for use with a tubular member having a circular cross section, such as tubular member 16 shown in FIG. 7B, support yoke 361 preferably has a generally ring-shaped configuration, the inside diameter of which preferably is slightly greater than the outer diameter of tubular member 16 so as to provide a removable yet snug fit between accessory anchor 360 and tubular member 16.

The contact surfaces of support yoke 361 define support surface 362. Support surface 362 has a width (measured in the axial direction of the tubular member) that is sufficient to resist any anticipated bending loads on accessory anchor 360. Support surface 362 can be shaped so that support strut 369 either is orthogonally disposed relative to the surface of the tubular member to which anchor 360 is fastened, or is inclined at a select non-orthogonal angle relative to that tubular member surface. For example, as shown in FIG. 7B, support surface 362 is oriented so that support strut 369 is inclined at an angle $\alpha_1$ relative to the surface of tubular member 16, where angle $\alpha_1$ is less than 90 degrees.

Figure 7D:
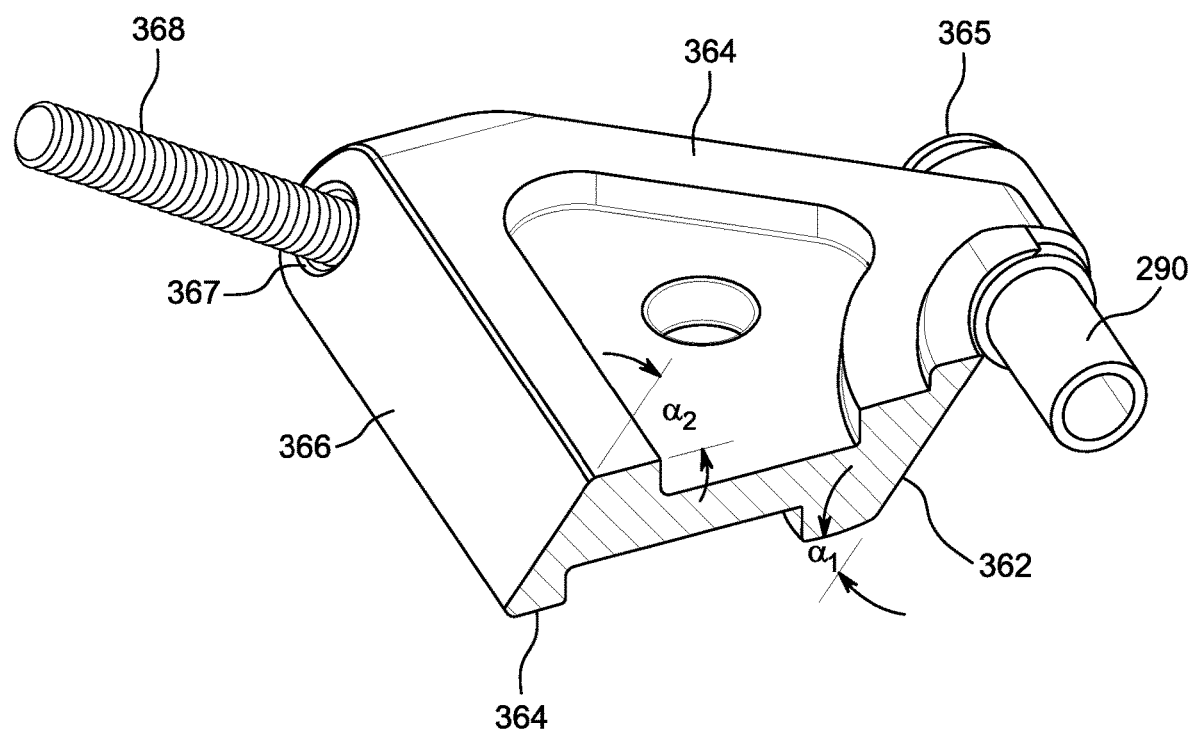
FIG. 7D is a perspective sectional view of an accessory anchor, including a boss and fastener assembly, and an accessory mounting bolt.

Although shown in the figures to be planar (see for example FIGS. 7A and 7D), accessory mounting surface 366 optionally can be curved or shaped as desired to accommodate the particular accessory to which it is to be fastened. For similar reasons, mounting surface 366 can be inclined relative to support strut 369 in one or two directions. Thus as shown in FIGS. 7B and 7D, mounting surface 366 is inclined at an angle $\alpha_2$ relative to support strut 369. Angle $\alpha_1$ can be approximately equal to angle $\alpha_2$, or can differ from angle $\alpha_2$, in accordance with usage considerations. In the embodiment shown, angle $\alpha_1$ is approximately equal to angle $\alpha_2$.

Accessory anchor 360 is useful for securing a wide variety of vehicle components and accessories to a tubular member, such as vehicle radiators.

Although boss 290 is utilized herein to fasten anchors 230, 250, 260, 270 and 360 to a tubular member, boss 290 can also be utilized to fasten vehicle components directly to an appropriate member of an automotive chassis without utilization of anchors 230, 250, 260, 270 or 360, as the situation may admit. In particular, boss 290 and associated supporting elements can be utilized to secure gearbox hanger plates directly to an exoskeleton/space frame chassis, which gearbox hanger plates facilitate the mounting of a gearbox to the chassis, and which are disclosed in U.S. Provisional Application No. 62/577,965 entitled "Invertible Reversible Multi-Application Gearbox," filed Oct. 27, 2017, and in U.S. patent application Ser. No. 16/168,957, filed Oct. 24, 2018, entitled "Invertible Reversible Multi-Application Gearbox," each having the same inventors as the subject application. Similarly, boss 290 and associated supporting elements also can be utilized to secure gearbox hangers directly to an exoskeleton/space frame chassis, which gearbox hangers facilitate the mounting of a gearbox to the chassis and which are disclosed in U.S. Provisional Patent Application No. 62/616,601 entitled "Gearbox Mounting System," filed Jan. 12, 2018, and in U.S. patent application Ser. No. 16/168,978, filed Oct. 24, 2018, entitled "Gearbox Mounting System," each having the same inventors as the subject application.

The contents of U.S. Provisional Patent Application No. 62/577,965 entitled "Invertible Reversible Multi-Application Gearbox," filed Oct. 27, 2017 and having the same inventors as the subject application, are hereby incorporated by reference as if fully set forth herein, particularly the disclosure relating to gearbox hanger plates using bosses and associated supporting elements to secure them to an exoskeleton/space frame chassis. Also, the contents of U.S. Nonprovisional patent application Ser. No. 16/168,957, entitled "Invertible Reversible Multi-Application Gearbox," filed Oct. 24, 2018 and having the same inventors as the subject application, are hereby incorporated by reference as if fully set forth herein, particularly including the disclosure relating to boss design and the design of gearbox hanger plates that are secured to an exoskeleton/space frame chassis using bosses and associated supporting elements, found for example at paragraph 51 and FIG. 2A. Further, the contents of U.S. Provisional Patent Application No. 62/616,601 entitled "Gearbox Mounting System," filed Jan. 12, 2018 and having the same inventors as the subject application, are hereby incorporated by reference as if fully set forth herein, particularly the disclosure relating to the design of gearbox hangers that can be secured to an exoskeleton/space frame chassis using bosses and associated supporting elements. In addition, the contents of U.S. Nonprovisional patent application Ser. No. 16/168,978, entitled "Gearbox Mounting System," filed Oct. 24, 2018 and having the same inventors as the subject application, are hereby incorporated by reference as if fully set forth herein, particularly including the disclosure relating to boss design and the design of gearbox hangers that can be secured to an exoskeleton/space frame chassis using bosses and associated supporting elements, found for example at paragraphs 25-53, 54 (sentences 1-2) and in FIGS. 1-2A and 2C-5D.

The foregoing detailed description is for illustration only and is not to be deemed as limiting the inventions, which are defined in the appended claims.

What is claimed is:

1. An anchor assembly for attachment to a tubular member having an exterior surface, comprising:
   an anchor base and first and second opposed spaced-apart anchor cheek members extending from the anchor base, the anchor cheek members adapted to secure a load-bearing vehicle component;
   the anchor base comprising a load-bearing exterior skirt and a load-bearing interior skirt circumscribed by the exterior skirt, where the exterior and interior skirts are dimensioned to be in contact with the exterior surface of the tubular member when positioned against it;
   the exterior skirt having a first pair of spaced-apart opposed cut-outs, each of the first pair of cut-outs having a shape that generally conforms to a shape of the exterior surface of the tubular member;
   the interior skirt having a second pair of spaced-apart opposed cut-outs, each of the second pair of cut-outs having a shape that generally conforms to the shape of the exterior surface of the tubular member;
   a boss having a first flanged end and a second end, the boss adapted to be positioned in first and second apertures in the exterior surface of the tubular member with the flanged end in contact with the first aperture and the second end accessible through the second aperture; and
   a fastener connected to the anchor base and the second end to secure the anchor base to the boss.

2. The anchor assembly of claim 1, further comprising a circular mount on each of the first and second anchor cheek members, each of the circular mounts located at an end of its respective anchor cheek member distal from the anchor base.

3. The anchor assembly of claim 2, wherein the circular mount on each of the first and second anchor cheek members defines an annular aperture.

4. The anchor assembly of claim 3, further comprising a locking nut on an exterior face of the circular mount on the first anchor cheek member.

5. A two-position anchor assembly for attachment to a tubular member having an exterior surface, comprising:
   an anchor base and first and second opposed spaced-apart anchor cheek members extending from the anchor base, the anchor cheek members adapted to secure a load-bearing vehicle component;
   the anchor base comprising a load-bearing exterior skirt and a load-bearing interior skirt circumscribed by the exterior skirt, where the exterior and interior skirts are dimensioned to be in contact with the exterior surface of the tubular member when positioned against it;
   the exterior skirt having first and second pairs of spaced-apart opposed cut-outs, the first pair approximately perpendicular to the second pair, each of the cut-outs of the first and second pairs of cut-outs having a shape that generally conforms to a shape of the exterior surface of the tubular member;
   the interior skirt having third and fourth pairs of spaced-apart opposed cut-outs, the third pair approximately perpendicular to the fourth pair, each of the cut-outs of the third and fourth pairs of cut-outs having a shape that generally conforms to the shape of the exterior surface of the tubular member;
   a boss having a first flanged end and a second end, the boss adapted to be positioned in first and second apertures in the exterior surface of the tubular member with the flanged end in contact with the first aperture and the second end accessible through the second aperture; and
   a fastener connected to the anchor base and the second end to secure the anchor base to the boss.

6. The anchor assembly of claim 5, further comprising a circular mount on each of the first and second anchor cheek members, each of the circular mounts located at an end of its respective anchor cheek member distal from the anchor base.

7. The anchor assembly of claim 6, wherein the circular mount on each of the first and second anchor cheek members defines an annular aperture.

8. The anchor assembly of claim 7, further comprising a locking nut on an exterior face of the circular mount on the first anchor cheek member.

9. A bearing anchor assembly for attachment to a tubular member having an exterior surface, comprising:
   an anchor base and first and second opposed spaced-apart anchor cheek plates extending from the anchor base, the first and second anchor cheek plates each including portions that define an annular aperture;
   a cylindrical shroud joining the portions of the first and second anchor cheek plates which define the first and second apertures to thereby define a recess, the recess adapted to receive a friction-reducing bearing assembly that receives a rotating shaft;
   a boss having a first flanged end and a second end, the boss adapted to be positioned in first and second apertures in the exterior surface of the tubular member with the flanged end in contact with the first aperture and the second end accessible through the second aperture; and
   a fastener connected to the anchor base and the second end to secure the anchor base to the boss.

10. The bearing anchor assembly as in claim 9, wherein the anchor base includes a concave load-bearing channel having a curvature that generally conforms to a shape of the exterior surface of the tubular member.

11. The bearing anchor assembly as in claim 9, wherein the first cheek plate is generally planar and the second cheek plate is curved.

12. A load anchor assembly for attachment to a tubular member having a tubular member axis and an exterior surface, comprising:
   an anchor base adapted to be secured to the exterior surface of the tubular member along its axis;
   first and second opposed spaced-apart anchor cheek plates extending from the anchor base and positioned thereon to be parallel to the tubular member axis when the anchor base is secured to the tubular member, the first and second anchor cheek plates respectively including first and second mounting apertures having a centerline oriented perpendicularly to the tubular member axis when the anchor base is secured to the tubular member so as to be adapted to secure a vehicle component;
   a boss having a first flanged end and a second end, the boss adapted to be positioned in first and second apertures in the exterior surface of the tubular member with the flanged end in contact with the first aperture and the second end accessible through the second aperture; and
   a fastener connected to the anchor base and the second end to secure the anchor base to the boss.

13. The load anchor assembly as in claim 12, wherein the anchor base includes a concave load-bearing channel having a curvature that generally conforms to a shape of the exterior surface of the tubular member.

14. The load anchor assembly of claim 12, wherein the first and second opposed spaced-apart anchor cheek plates are generally triangular in shape.

15. The load anchor assembly of claim 14, wherein each of the first and second opposed spaced-apart cheek plates defines an annular aperture distal from the base.

16. The load anchor assembly of claim 15, further comprising a locking nut on an exterior face of the first cheek plate.

17. An anchor assembly for attachment to a tubular member having an exterior surface, comprising:
   an anchor yoke adapted to be secured to the exterior surface of the tubular member, the anchor yoke having a curved support surface terminating in two opposed fastening mounts;
   a planar accessory support strut joined to the anchor yoke; the curved support surface of the anchor yoke shaped so that the accessory support strut is inclined at an acute angle relative to the exterior surface of the tubular member;
   an accessory mounting surface distal from the anchor yoke and joined to the accessory support strut;
   a boss having a first flanged end and a second end, the boss adapted to be positioned in first and second apertures in the exterior surface of the tubular member with the flanged end in contact with the first aperture and the second end accessible through the second aperture;
   the two opposed fastening mounts each defining an annular aperture for receiving the boss; and
   a fastener passing through each of the annular apertures of the two opposed fastening mounts and the boss to secure the anchor yoke to the boss.

18. The anchor assembly as in claim 17, wherein the two opposed fastening mounts are aligned so that the boss is oriented in the plane of the accessory support strut when the boss is received in the fastening mounts.

19. The anchor assembly of claim 17, wherein the curved support surface of the anchor yoke is shaped so that the accessory support strut is inclined at an angle $\alpha_1$ relative to the exterior surface of the tubular member, and the accessory mounting surface is inclined at an angle $\alpha_2$ relative to the planar accessory support strut which is equal to $\alpha_1$.

* * * * *